(12) United States Patent
Briongos et al.

(10) Patent No.: US 12,547,781 B2
(45) Date of Patent: Feb. 10, 2026

(54) SECURE SETUP FOR DISTRIBUTED MONOTONIC COUNTER SERVICES

(71) Applicant: NEC Laboratories Europe GmbH, Heidelberg (DE)

(72) Inventors: Samira Briongos, Heidelberg (DE); Claudio Soriente, Heidelberg (DE); Annika Wilde, Bochum (DE); Ghassan Karame, Bochum (DE)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 18/544,476

(22) Filed: Dec. 19, 2023

(65) Prior Publication Data
US 2025/0111097 A1   Apr. 3, 2025

Related U.S. Application Data

(60) Provisional application No. 63/541,318, filed on Sep. 29, 2023.

(51) Int. Cl.
  *H04L 29/06*   (2006.01)
  *G06F 21/60*   (2013.01)
  *G06F 21/78*   (2013.01)

(52) U.S. Cl.
  CPC .......... *G06F 21/78* (2013.01); *G06F 21/602* (2013.01); *G06F 21/606* (2013.01)

(58) Field of Classification Search
  None
  See application file for complete search history.

(56) References Cited

U.S. PATENT DOCUMENTS

| | | | |
|---|---|---|---|
| 9,444,627 B2* | 9/2016 | Varadarajan | G09C 1/00 |
| 10,706,143 B2* | 7/2020 | Narendra Trivedi | G06F 21/57 |
| 10,977,381 B2* | 4/2021 | Mannan | G06F 21/6281 |
| 11,126,699 B2* | 9/2021 | Soriente | G06F 9/545 |
| 11,659,392 B2* | 5/2023 | Avetisov | H04L 63/0815 726/1 |

(Continued)

FOREIGN PATENT DOCUMENTS

| | | |
|---|---|---|
| CN | 113810382 A | 12/2021 |
| EP | 4167086 A1 | 4/2023 |

OTHER PUBLICATIONS

Brijwasi, Harshit; "Problems in Handling Multiple Processes in OS and Solutions"; *Operating System;* Mar. 11, 2023; pp. 1-5; Yuvayana—Tech and Craft; Rampur, Uttar Pradesh, India.

(Continued)

*Primary Examiner* — Maung T Lwin
(74) *Attorney, Agent, or Firm* — Leydig, Voit & Mayer, Ltd.

(57) ABSTRACT

The present invention provides a computer-implemented method for providing a service to a trusted execution environment (TEE). A data item is written by a process running in the TEE to a pre-defined cache location. The data item is monitored to determine whether it is evicted from the pre-defined cache location. A setup procedure is accepted as complete based on the data item not being evicted from the pre-defined cache location. The present invention can be used in a variety of applications including, but not limited to, several anticipated use cases in cloud services, machine learning, and medical/healthcare. This invention can also provide lower access times if optimized for performance.

17 Claims, 29 Drawing Sheets

(56) References Cited

U.S. PATENT DOCUMENTS

| | | | |
|---|---|---|---|
| 11,704,442 B2* | 7/2023 | Maximov | G06F 21/629 726/26 |
| 2009/0049510 A1* | 2/2009 | Zhang | G06F 21/53 718/1 |
| 2009/0292904 A1* | 11/2009 | Henry | G06F 21/74 712/E9.016 |
| 2019/0236168 A1 | 8/2019 | Vaswani et al. | |
| 2019/0319843 A1* | 10/2019 | Telfer | H04L 41/0806 |
| 2020/0162346 A1* | 5/2020 | Diaz-Cuellar | H04L 9/0897 |
| 2021/0110064 A1* | 4/2021 | Ibrahim | G06F 21/72 |
| 2021/0111901 A1* | 4/2021 | Ibrahim | G06F 21/72 |
| 2021/0334362 A1* | 10/2021 | Cogniaux | G06F 21/53 |
| 2022/0222358 A1* | 7/2022 | Sahita | G06F 21/44 |
| 2022/0245237 A1 | 8/2022 | Briongos et al. | |
| 2023/0161911 A1* | 5/2023 | Dou | G06F 21/53 726/17 |
| 2023/0168954 A1 | 6/2023 | Briongos et al. | |
| 2023/0222209 A1 | 7/2023 | Almeida | |

OTHER PUBLICATIONS

Cen, Shanwei et al.; "Trusted Time and Monotonic Counters with Intel® Software Guard Extensions Platform Services"; *Intel® Software Guard Extensions (Intel® SGX)*; Sep. 13, 2017; pp. 1-15; Intel Corporation; Santa Clara, CA, USA.

Chen, Guoxing et al.; "MAGE: Mutual Attestation for a Group of Enclaves without Trusted Third Parties"; *31st USENIX Security Symposium;* Aug. 21, 2020; pp. 1-15; vol. 1; ArXiv.org, Cornell University; Ithaca, NY, USA.

Dinis, Baltasar et al.; "RR: A Fault Model for Efficient TEE Replication"; *Proceedings of the 2023 Symposium on Network and Distributed System Security (NDSS)*; Feb. 27, 2023; pp. 1-18; IEEE; Piscataway, NJ, USA.

El-Hindi, Muhammad et al.; "Benchmarking the Second Generation of Intel SGX Hardware"; *Proceedings of the 18th International Workshop on Data Management on New Hardware;* Jun. 13, 2022; pp. 1-8; Art. No. 5; ACM Publications; New York, NY, USA.

Zhang, Jiashuo et al.; "Efficient Byzantine Fault Tolerance using Trusted Execution Environment: Preventing Equivocation is only the Beginning"; *ICC 2022—IEEE International Conference on Communications;* Jul. 6, 2021; pp. 1-12; Art. No. 3; ArXiv.org, Cornell University; Ithaca, NY, USA.

Kim, Taehoon et al.; "ShieldStore: Shielded In-memory Key-value Storage with SGX"; *Proceedings of the 14th EuroSys Conference 2019;* Mar. 25, 2019; pp. 1-15 (Abstract); Art. No. 14; ACM Publications; New York, NY, USA.

* cited by examiner (a) Overview of a rollback attack.

(b) Overview of a cloning attack.

SECURE SETUP FOR DISTRIBUTED MONOTONIC COUNTER SERVICES

CROSS-REFERENCE TO PRIOR APPLICATION

Priority is claimed to U.S. Provisional Application Ser. No. 63/541,318 filed on Sep. 29, 2023, the entire contents of which is hereby incorporated by reference herein.

FIELD

The present invention relates to a method, system, data structure, computer program product and computer-readable medium for monotonic counters, in particular for Trusted Execution Environments (TEEs).

BACKGROUND

A TEE (which can also be referred to as an "enclave") offers an execution space that provides a high level of security and privacy for applications. Typically, a TEE provides security features such as integrity of applications and confidentiality of the application's assets. Many of today's TEEs are realized by dedicated, protected parts of a central processing unit (CPU), including the computer's caches and main memory, which is isolated and encrypted. A prominent example of a TEE is provided by INTEL Software Guard Extensions (SGX) and is referred to as an enclave. Victor Costan, et al., "Intel SGX Explained," Cryptology ePrint Archive, Report 2016/086 (2016), which is hereby incorporated by reference herein, describe SGX in great detail, with section 5 providing an overview of using SGX from a programmer's perspective, and also overview other trusted execution environments. In particular, TEEs, such as the enclaves in SGX, enable applications to run in isolation from any other software on the same platform (e.g., same machine). Furthermore, applications running in TEEs benefit from encrypted and authenticated storage (also referred to by the term "sealing") and cryptographic mechanisms (also referred to by the term "remote attestation") that allow remote third parties to verify the software configuration of the application running in the TEE.

SGX offers hardware-based isolation to trusted applications that run in the so-called enclaves. Enclave isolation leverages dedicated, hardware-protected memory and prevents access to this memory from any processes running at higher privilege levels, including the operating system (OS) or the hypervisor. SGX also allows enclaves to store encrypted and authenticated data to disk by means of a sealing process. Further, SGX offers the remote attestation mechanism that allows remote third parties to verify if an application is running inside an enclave and that the software running inside the enclave is the expected software.

SUMMARY

In an embodiment, the present invention provides a computer-implemented method for providing a service to a trusted execution environment (TEE). A data item is written by a process running in the TEE to a pre-defined cache location. The data item is monitored to determine whether it is evicted from the pre-defined cache location. A setup procedure is accepted as complete based on the data item not being evicted from the pre-defined cache location. The present invention can be used in a variety of applications including, but not limited to, several anticipated use cases in cloud services, machine learning, and medical/healthcare. This invention can also provide lower access times if optimized for performance.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
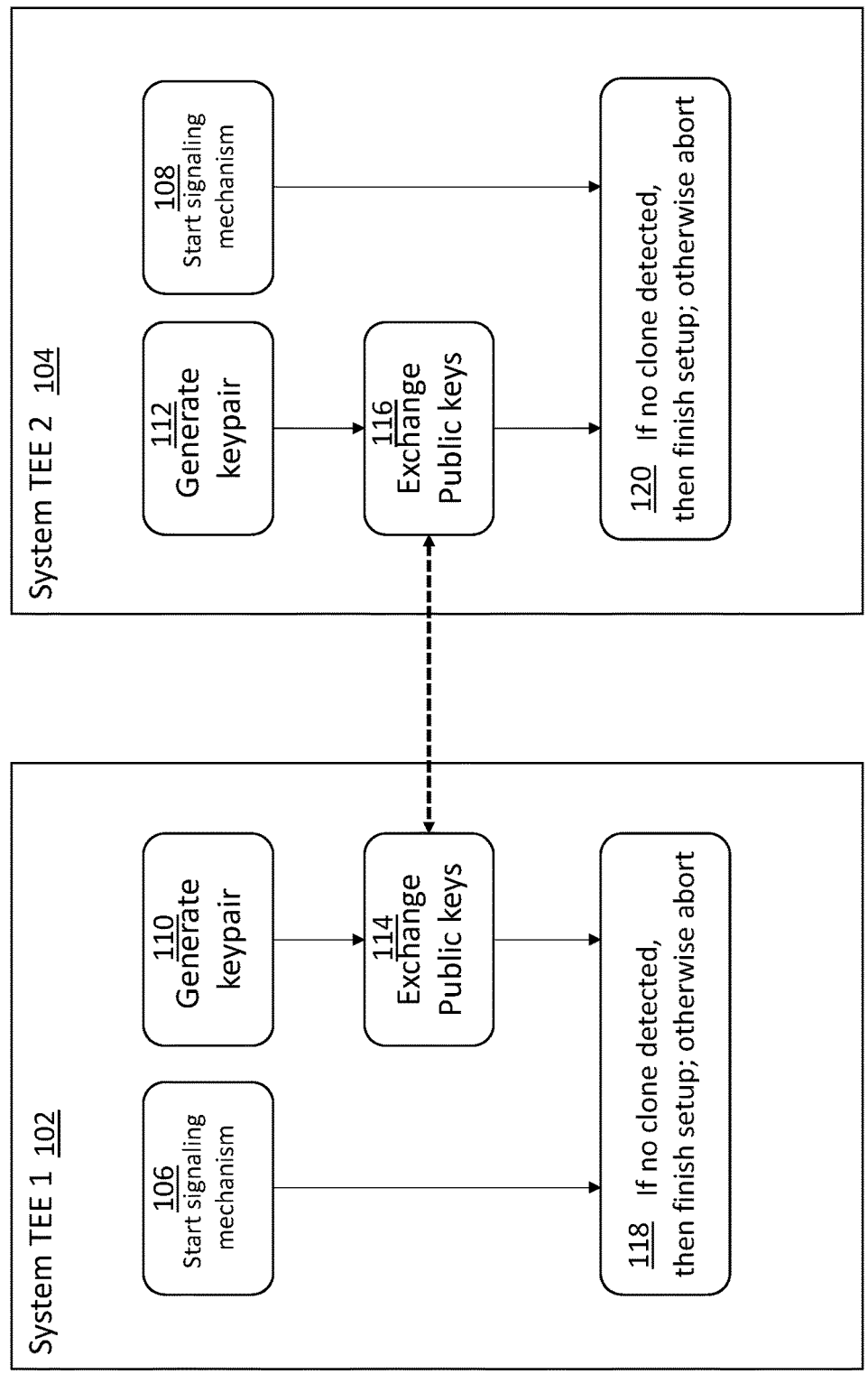
FIG. 1 schematically illustrates a method and system for a secure setup for distributed monotonic counter services according to an embodiment of the present invention.

A monotonic counter for a Trusted Execution Environment (TEE) allows the TEE applications to distinguish fresh from stale data stored to disk. Current instantiations of monotonic counter services are distributed, i.e., they require a set of "system" TEEs running on different platforms that keep monotonic counters on behalf of other "application" TEEs. The setup procedure of the system TEEs requires an external trusted party. Embodiments of the present invention improves security and enhances the setup procedure of the group of service TEEs to drop the need for the external trusted party.

In an embodiment, the present invention provides a method for setting up a group of processes running in trusted execution environments that provide a distributed monotonic counter service, without using any additional trusted party, the method comprising the steps of:

1. Deploying two or more processes, each of them in a trusted execution environment of a different platform.
2. Writing, by each process, a data item to a pre-defined cache location.
3. Monitoring, by each process if the data of step 2 is evicted from cache: monitoring is carried out until the last step. In embodiments, step 3 is executed for the duration of step 4. The enclave will monitor data in the pre-defined cache location until it has exchanged key-pairs with all other enclaves.
4. Generating and exchanging, by each process, a cryptographic key-pair.
5. Accepting, by each process, the setup procedure as successful if the data written to cache during step 2 has not been evicted.

Embodiments of the present invention provide for the following improvements and technical advantages over existing technology:

1) Generating and exchanging, by two or more processes, each running in a trusted execution environment of a different platform, public keys while writing data to a pre-defined location of the cache and ensuring that data written to cache has not been evicted.
2) In contrast to existing technology, embodiments of the present invention advantageously do not require a trusted third party when the set of service TEEs is being setup, thereby enhancing security of the computer systems and applications, as well as conserving resources by not requiring the third party. Further, embodiments of the present invention enable multiple TEEs on the same platform to join the setup procedure of different groups in parallel, thereby further improving computational efficiency and saving computational resources.

In a first aspect, the present invention provides a computer-implemented method for providing a service to a trusted execution environment (TEE). A data item is written by a process running in the TEE to a pre-defined cache location. The data item is monitored to determine whether it is evicted from the pre-defined cache location. A setup procedure is accepted as complete based on the data item not being evicted from the pre-defined cache location.

In a second aspect, the present invention provides the method according to the first aspect, wherein the data item is written to the pre-defined cache location by the process via a selected channel that is hardcoded into an updated version for the TEE.

In a third aspect, the present invention provides the method according to the first or second aspect, further comprising: generating and exchanging, by the process with at least one other process running in a TEE deployed on a different platform, a cryptographic key-pair; and sealing, by the process, the cryptographic key-pair to local storage.

In a fourth aspect, the present invention provides the method according to any of the first to third aspects, wherein exchanging the cryptographic key-pair includes sending between the process and the at least one other process a corresponding public key of the cryptographic key-pair with a hash of a respective seal key such that the at least one other process generated an associated cryptographic key-pair.

In a fifth aspect, the present invention provides the method according to any of the first to fourth aspects, wherein a tuple of the public key represents an identifier of the process.

In a sixth aspect, the present invention provides the method according to any of the first to fifth aspects, further comprising receiving, by the process, a session key in response to mutually attesting with the at least one other process: computing, by the process, a hash of a list of received public keys, the hash of the list of received public keys including the public key of the process and the at least one other process; and receiving, by the process from the at least one other process, a hash of a list of received public keys of the at least one other process via a secure channel using the session key.

In a seventh aspect, the present invention provides the method according to any of the first to sixth aspects, further comprising verifying, by the process, that the hash of the list of received public keys from the at least one other process is the same as the computed hash, wherein the process continues in response to the hashes being the same or terminates in response to the hashes not being the same.

In an eighth aspect, the present invention provides the method according to any of the first to seventh aspects, further comprising storing the list of received public keys in a persistent state.

In a ninth aspect, the present invention provides the method according to any of the first to eighth aspects, further comprising generating a monotonic counter that is set to zero and stored in persistent memory of the TEE based on verifying the hashes are the same.

In a tenth aspect, the present invention provides the method according to any of the first to ninth aspects, further comprising sealing, by the process, the persistent state to local storage and including the monotonic counter, wherein the monotonic counter is in an inc-then-store mode.

In an eleventh aspect, the present invention provides the method according to any of the first to tenth aspects, further comprising receiving, by the process, a local attestation request from an application TEE: establishing, by the application TEE and the process, a shared key that is used to encrypt communications between the application TEE and the process: transmitting, by the application TEE to the process, one or more parameters including an identifier (id), a first indication of how many clones with a same binary can run in parallel, and a second indication that determines if the clones share a same state or maintain individual states; and updating, by the process, an application configuration table and an application session table based on receiving the one or more parameters by at least: scanning the application configuration table to determine that an entry does not exist that corresponds to the one or more parameters: initializing a new monotonic counter that is set to zero: updating parameter m of the application configuration table to 1; and storing data from the application in the application session table.

In a twelfth aspect, the present invention provides the method according to any of the first to eleventh aspects, wherein the one or more parameters are written as constants in code for the application TEE.

In a thirteenth aspect, the present invention provides the method according to any of the first to twelfth aspects, wherein the steps of writing the data item to the pre-defined cache location and monitoring whether the data item is evicted from the pre-defined cache location are continuously or iteratively performed until accepting that the setup procedure is complete.

In a fourteenth aspect, the present invention provides a computer system for providing a service to a trusted execution environment (TEE) comprising one or more processors which, alone or in combination, are configured to perform a method for providing a service to a TEE according to any of the first to thirteenth aspects.

In a fifteenth aspect, the present invention provides a tangible, non-transitory computer-readable medium for providing a service to a trusted execution environment (TEE) which, upon being executed by one or more hardware processors, provide for execution of a method according to any of the first to thirteenth aspects.

FIG. 1 schematically illustrates a method and system for a secure setup for distributed monotonic counter services according to an embodiment of the present invention. FIG. 1 depicts two system trusted execution environments (TEEs) 102 and 104. As described above, the secure setup described herein includes deploying two or more processes, each in a TEE (102 and 104) of a different platform. Within each TEE 102 and 104, the method includes starting a signaling mechanism 106 and 108. In embodiments, the TEE 102 and TEE 104 may represent a system enclave (SE) and the signaling mechanism 106 and 108 may include launching CloneBuster as described below. This can include signaling its presence and monitoring a selected channel for n=1. This channel may be hardcoded into an updated version of the SE such that the channel is verified as part of an attestation mechanism and can't vary for enclaves on the same host. In embodiments the setup is aborted if at any time between the generation and the exchange of keys the signaling mechanism 106 and 108 detect a clone of the enclave on the platform.

As depicted in FIG. 1, the method may include, within each TEE 102 and 104, generating a key pair 110 and 112. For example, each SE (TEEs 102 and 104) may generate a long-term key pair $K_{SE}=(sk_{SE}, pk_{SE})$. In embodiments, each SE (TEEs 102 and 104) may seal the key pair $K_{SE}$ to the disk to persist it for restarts. The method depicted in FIG. 1 may include exchanging public keys 114 and 116 between the TEEs 102 and 104. For example, each SE (TEEs 102 and 104) may send its public key, $pk_{SE}$, to other SEs (e.g., TEE 102 sending its public key to TEE 104 or vice versa) with a hash, h, of its seal key. The tuple ($pk_{SE}$, h) serves as an identifier of an SE on that specific platform and prevents another enclave from joining the network with a different public key. As illustrated in FIG. 1, the method includes consistently running CloneBuster to detect a clone and if a clone is detected the setup is aborted (118 and 120). In embodiments, if any of the processes during setup fail by either TEE 102 or 104, the setup is aborted as well. The CloneBuster process of detecting clones by using a cache-based covert channel is described below.

In the following, further background and description of exemplary embodiments of the present invention, which may overlap with some of the information provided above, are provided in further detail. To the extent the terminology used to describe the following embodiments may differ from the terminology used to describe the preceding embodiments, a person having skill in the art would understand that certain terms correspond to one another in the different embodiments. Features described below can be combined with features described above in various embodiments.

Over the last two decades, cloud computing gained considerable popularity and adoption, and the concept of TEEs emerged to provide confidentiality and integrity in untrusted cloud scenarios. The TEE from Intel, Secure Guard Extension (SGX), suffers from technical problems such as forking attacks, for example rollback and cloning attacks, because enclaves do not provide freshness guarantees for sealed data: nonetheless, it is still widely adopted by the industry. While rollback attacks and mitigations have been extensively studied by the community, cloning attacks are highly underrated by developers and the research community. The field of forking attacks and mitigations in SGX are described herein, as well as examinations of the impact of cloning attacks on SGX enclaves. A case study is performed in which 72 SGX-based proposals are analyzed for their susceptibility to cloning attacks. 19.4% of the analyzed proposals are found to be insecure against cloning attacks-including applications that rely on monotonic counters, thus they are secure against rollback attacks. A new TTP-based anti-forking solution fixing existing solutions and providing additional mechanisms for controlled cloning are provided by embodiments of the present invention.

Stateful applications often require the state to be continuous, i.e., an adversary (e.g., malicious actor) cannot revert it to a previous state, and there cannot be two states with the same prefix. The current disclosure denotes attacks breaking state continuity as forking attacks. In SGX applications, an adversary can fork a state by rolling back the state or cloning enclaves.

In rollback attacks, an adversary can exploit that enclaves cannot persist state across restarts. An enclave needs to seal data to persist the data when the enclave terminates or crashes. The sealed data is then stored on the disk, which is untrusted memory.

For example, assume the enclave is in initial state $S_0$. It sequentially retrieves three inputs from the host application, $I_1$, $I_2$, and $I_3$. Let the function executed by the enclave be $f$. The enclave sequentially executes $f$ on the inputs and updates its state accordingly. After each state update, it seals the current state and sends it to the host application that stores it on disk. The sealed state after processing input is denoted as $I_j$ as $D_j$. The final state is $S=f(f(f(S_0, I_1), I_2), I_3)$. Further assume the enclave terminates or crashes after executing the first two inputs, $I_1$ and $I_2$. The application can provide the sealed state $D_2$ at enclave restart. The enclave then correctly proceeds to the state S if provided with input $I_3$.

Figure 3:
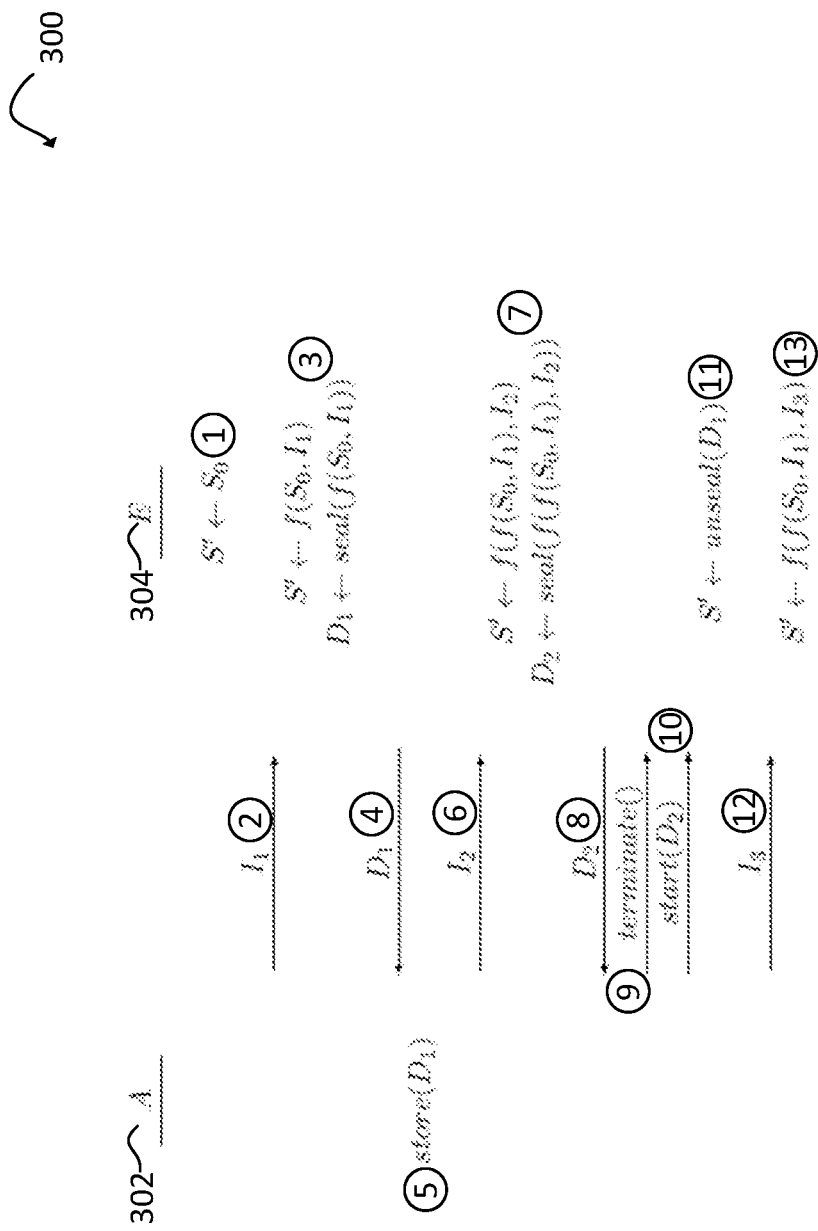
FIG. 3 depicts an overview of a rollback attack.

Now assume an adversary, A (302), controlling the application or the memory where the application stores the sealed state. FIG. 3 depicts that the adversary 302 can roll back the enclave state. The enclave 304 again is in initial state $S_0$ (Step 1). The application controlled by the adversary A 302 provides the enclave 304 with $I_1$ (Step 2). The enclave 304 proceeds to the state $f(S_0, I_1)$ and returns the sealed state $D_1$ to the application controlled by the adversary 302 (Step 3).

Afterward, the enclave 304 receives $I_2$ (Steps 4, 5, and 6) and returns $D_2=\text{seal}(f(f(S_0, I_1), I_2))$ to the application controlled by the adversary 302 (Steps 7 and 8). In this state, the enclave 304 terminates (Step 9). When E 304 restarts, A 302 provides it with a sealed state (Step 10). However, this state can be stale, e.g., $D_1$, instead of the latest sealed data $D_2$. If the enclave 304 executes $f$ on $I_3$, the final state of the enclave 304 is $S'=f(f(S_0, I_1), I_3)$ (Steps 12 and 13). The state forks because of $S' \neq S$. Forking the state by providing the enclave 304 with stale sealed data is called a rollback attack. An adversary, such as A 302, can also roll back the state by crashing the enclave 304 before it seals and returns the updated state. However, this limits the attack to rolling back one state update, whereas the adversary A 302 can roll back arbitrarily many state updates by providing stale sealed data.

An example of an application where an adversary can exploit rollback vulnerabilities is a login service with rate limiting. Assume the enclave's state keeps track of the remaining password guesses for each user. Initially, each user has five guesses. At each guess, the enclave updates and seals the state accordingly. An adversary can crash the enclave after each incorrect guess and provide the enclave with the initial state where the remaining guesses are five for each user. Thereby, an adversary has arbitrarily many guesses, circumventing the rate limiting.

Figure 4:
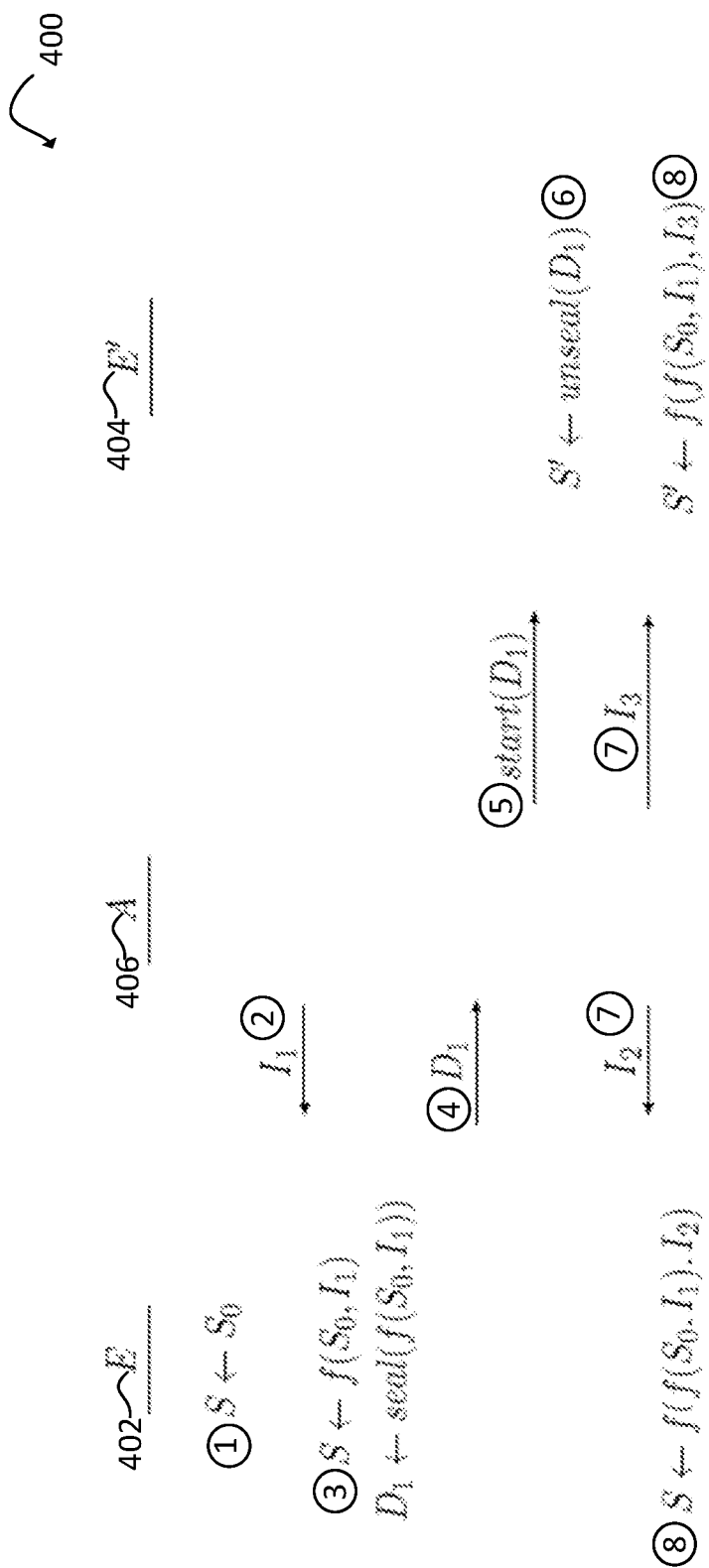
FIG. 4 depicts an overview of a cloning attack.

As an overview of a cloning attack, consider, with reference to FIG. 4, an enclave a clone if two (or more) instances (e.g., 402 and 404), of an enclave with the same binary run in parallel. In a cloning attack, the adversary 406 starts multiple instances of the same enclave (e.g., E and E', 402 and 404, respectively), and provides them with different inputs, thereby forking the state. If the enclave seals data, both clones 402 and 404 can unseal the data since they are launched with the same binary, i.e., they have the same Enclave Measurement and Sealing Measurement.

Assume a scenario where the enclave sequentially processes the inputs $I_1$, $I_2$, and $I_3$. After processing all inputs, the enclave is in state $f(f(f(S_0, I_1), I_2), I_3)$. Now assume an adversary controlling the OS, i.e., A 406 can arbitrarily start and terminate enclaves. The adversary can perform a cloning attack as shown in FIG. 4. A 406 starts an enclave instance, E 402, and provides it with $I_1$ and $I_2$ (Steps 1, 2, and 7), receiving $D_1$ and $D_2$ (Step 4). The final state of this instance is $S=f(f(S_0, I_1), I_2)$ (Step 8). The adversary A 406 starts a second instance of the same enclave, E' 404, and provides it with $D_1$ (Step 5) received from E 402. E' 404 is a clone of E 402, i.e., has the same Seal Key, thus can unseal $D_1$ and initialize its state to $f(S_0, I_1)$ (Step 6). A third input, $I_3$, is sent to E' 404 instead of E 402 (Step 7). E' 404 processes $I_3$ and proceeds to the state $S'=f(f(S_0, I_1), I_3)$ (Step 8). Again, the state forks because of $S' \neq S$.

In this scenario, the final state of E' 404 equals the final state of the rollbacked enclave. The difference between the two attacks (rollback attack and cloning attack) is that a cloning attack does not require the attacker to terminate and restart the enclave. Additionally, the adversary has two parallel enclaves with different states. A 406 splits all inputs between E 402 and E' 404, thus continuing both states without terminating the enclaves and providing them with the corresponding sealed data. Hence, a cloning attack introduces less delay. Further, a cloning attack does not require the enclave to seal data. Assume the enclave has a hardcoded initial state equal to $f(S_0, I_1)$ in the above scenario. The adversary can fork the state to S and S' without involving sealed data. In this scenario, a rollback attack can only roll back the enclave to the initial state, and the adversary cannot recover any other state after the enclave terminates. However, the adversary can simultaneously preserve two valid but different states, performing a cloning attack.

In the rate-limiting scenario described above, an adversary can speed up the process significantly. Instead of rolling back the state after each failed password guess, they can run arbitrarily many enclave instances and check multiple guesses in parallel.

The following paragraphs give a description of conventional solutions for preventing forking attacks.

Monotonic counters (MCs) are counters that are strictly permitted to increase. An Monotonic Counter (MC) cannot be reset to a value lower than the current value. When deploying an MC to guarantee state continuity or freshness of sealed data, the enclave seals the current MC value with the protected data. After unsealing, the enclave compares the counter value included in the data with the current MC value. The enclave considers the data fresh if the sealed data's counter value is larger or equal to the current MC value. Otherwise, the enclave can take appropriate actions, e.g., refuse to resume and terminate.

Securing sealed data with an MC includes two steps: increasing the monotonic counter, referred to as inc, and sealing the data with the updated counter value, referred to as store. An enclave cannot parallelly execute store and inc. Thus, an enclave developer needs to choose the sequence of these operations. There are two approaches to updating a state using an MC: store-then-inc and inc-then-store.

The below pseudo-code for store-then-inc shows a sealing operation that uses the store-then-inc mode. First, the enclave retrieves the current MC value and seals the data with the next counter value. Afterward, it increments the MC.

store_then_inc (data, MC):
    counter←MC.value( )+1
    seal (data, counter)
    MC.increment ( )

This approach leaves an open window for rollback and cloning attacks. Assume an enclave that sealed the latest state $s_i$ with the counter value $c_i$, i.e., the MC holds the value $MC_i$. The value $MC_i$, held by the counter is distinguished from the counter value seen by the enclave. The sealed data is referred to as $D_i=\text{seal}(c_i\|s_i)$. The state is updated to $s_{i+1}$, and the enclave deploys the store-then-inc mode to update the sealed data. It retrieves the counter value $MC_i$, and seals $s_{i+1}$ with the counter value $c_{i+1}=MC_{i+1}$ to $D_{i+1}$. Before the enclave updates the MC to $MC_{i+1}$, the enclave crashes. In a non-adversarial setting, the OS provides the enclave with the latest sealed data $D_{i+1}$. However, an adversary can crash the enclave on purpose before the execution of the MC increment and then provide the enclave with the stale sealed data $D_i$. The enclave unseals the data and verifies that the MC value equals the counter value $c_i$ included in the sealed data. Since the enclave did not update the MC to $MC_{i+1}$, it holds the value $MC_i$ equal to $c_i$. Thus, the checks pass, and the enclave resumes execution with a stale state. However, an adversary can only roll back the state by one update.

Assume the same scenario, but the adversary clones the enclave creating two instances, E and E'. Both enclaves have the same state $s_i$, sealed to $D_i$. E gets the input I and proceeds to state $s_{i+1}$, while E' receives the input I', proceeding to a different state $s_{i+1}'$. Afterward, both enclaves seal their state with the counter value $c_{i+1}=MC_{i+1}$, generating sealed data packages $D_{i+1}$ and $D_{i+1}'$. E increments the MC to $MC_{i+1}$. Before E' can increment the MC to $MC_{i+2}$, the adversary crashes the enclave. Therefore, the MC keeps the same value that both sealed data packages contain. Both sealed data packages remain valid, and an enclave cannot distinguish the sealed data. An attacker can leverage tools like SGXStep to control the execution of the enclave at the instruction level and delay the execution of the instruction incrementing the MC.

Pseudocode for an alternative to the store-then-inc mode is the deployment of inc-then-store, shown below. Since the enclave increments the MC before it seals the data with the MC, the attacks above are mitigated. However, the inc-then-store mode has liveness issues.

inc_then_store (data, MC):
  MC.increment( )
  counter←MC.value( )
  seal(data, counter)

Assume the currently sealed data is $D_i$=seal $(c_i\|s_i)$. Now, the enclave increments the MC to $MC_{i+1}$, and the new state, $S_{i+1}$, is sealed with the updated MC value afterward. When restarting the enclave, it only accepts the state $D_{i+1}$ and detects a forking attack if provided with $D_i$. However, the enclave does not only crash when an adversary intervenes. It can also crash for other reasons, e.g., an invalid input or a power outage.

For some applications, an enclave can handle the inconsistency between the sealed counter and the MC value. Assume the password rate limiting service where each user has a limited amount of guesses in a defined period, and the enclave tracks the remaining guesses. If the enclave detects a rollback attack, it can set the guesses to zero for all users for a pre-defined period. The availability of the service is affected for a limited period, but it can resume its execution, and an adversary cannot exploit the behavior. On the contrary, a banking service must not resume if it detects any inconsistency. If the enclave crashes before it seals the data, it can never recover from crash.

Although an adversary aiming to fork an application cannot exploit the inc-then-store mode, this approach does not provide liveness for all applications. Thus, when deploying MCs, a developer trades security for liveness and vice versa.

A monotonic counter can be hardware-backed or provided by software. Hardware-backed monotonic counters are implemented using non-volatile memory, thus wearing out quickly. Trusted Platform Modules (TPMs) provided the first MC implementations with an update rate of about 5 s. A faster alternative provided by TPMs is NVRAM, non-volatile memory an application can leverage to implement a monotonic counter. However, the NVRAM has a write time of about 100 ms and wears out after at most 1.4 million writes. Besides the TPM solutions, SGX provided its own MC implementation. The SGX MCs wear out after approximately one million writes. Additionally, they have an update latency of 80-250 ms. For applications that require frequent state updates, the access latency for these hardware-backed MCs is too high, and the approximated lifetime of a counter is only a few days. Therefore, existing hardware solutions are not usable for applications with frequent state updates or small latency requirements. Additionally, current versions of the SGX SDK do not support the SGX MCs.

Besides hardware-based solutions, an MC can be implemented in software. In software, distributed systems or a Trusted Third Party (TTP) can provide an MC. These solutions are described below.

The problems of hardware MCs are their latency and lifespan. Alternatively to hardware MCs, an application can deploy software MCs. The software does not wear out, and can provide lower access times if optimized for performance.

Figure 5:
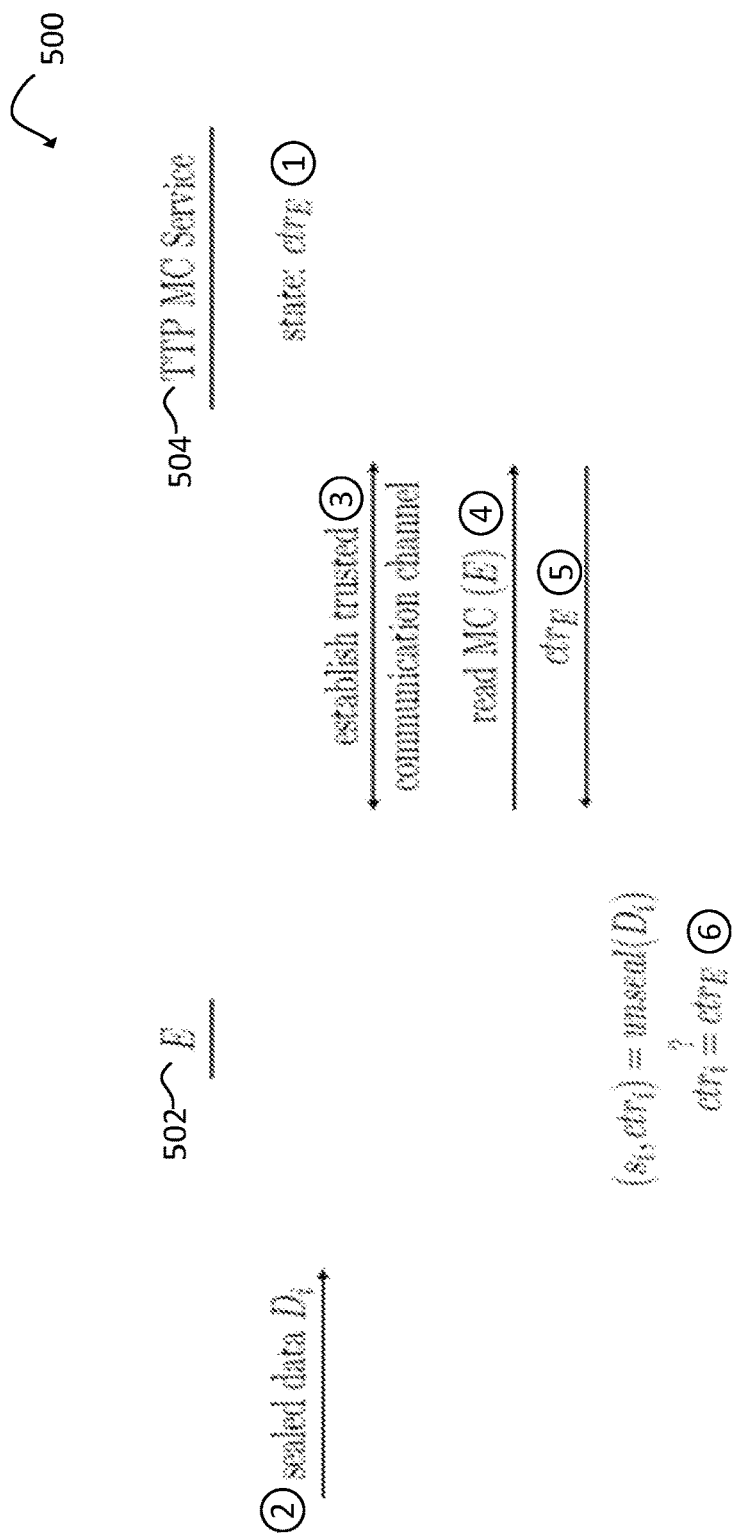
FIG. 5 depicts an overview of an enclave using a Monotonic Counter (MC) service provided by a trusted third party (TTP)

Instead of using trusted hardware to maintain the monotonic counter, an enclave can deploy an external party that it trusts to back its state with a freshness tag, e.g., an MC. Such a trusted external party is called Trusted Third Party (TTP). At every state update, the enclave connects to the TTP that updates the freshness tag of the application and seals its state. FIG. 5 shows the procedure at enclave restart for an Enclave E 502 and a TTP that hosts an MC service 504. At the restart, the OS provisions the enclave E 502 with sealed data (Steps 1 and 2). Before the enclave E 502 resumes its execution, it verifies the freshness of the sealed data requesting its MC value from the TTP service 504. First, it establishes a trusted channel with the TTP service 504 (Step 3). Over this trusted channel, it requests its latest MC value, $ctr_E$ (Steps 4 and 5). E 502 then unseals the data and compares the contained counter value, $ctr_i$, with $ctr_E$. If the checks succeed, the enclave E 502 resumes its execution (Step 6). Otherwise, it takes appropriate actions.

However, forking attacks are possible if the TTP service is compromised. A compromised TTP service can provide the enclave with arbitrary MC values and allow multiple clones to run. In this case, an adversary controlling the TTP service and the platform hosting the enclave can fork the application relying on the TTP. Thus, trusting external parties is avoided. Conventional TTP services providing state continuity do not provide protection for applications.

In TTP solutions, the enclave must trust a third party. Besides trusting an organization due to security claims, an application can establish trust if the TTP runs inside an enclave. However, the external enclave encounters the same issues concerning forking attacks as the enclave deploying the TTP service. A solution to this issue is distributed systems. If an application does not contain multiple distributed enclaves, it can deploy a (distributed) TTP service to secure its enclave's state. If the application is a distributed system, it can use the distributed components to mitigate forking attacks without deploying a TTP.

Considering a monotonic counter to ensure the freshness of sealed data, each enclave can persist a table of MCs in its runtime memory. The table stores the MC value of each enclave on the other platforms. When an enclave updates its state, it sends a message to the other enclaves, verifying and updating the corresponding MC. If at least one enclave is running, the system preserves the MCs of all enclaves. If an enclave terminates or crashes, it requests its current MC value from the other enclaves at the restart. It can then verify the freshness of its sealed state by comparing the sealed counter value with the highest MC value received from the assisting enclaves.

Besides a distributed system where the enclaves assist each other to secure diverging states, a distributed system can consist of multiple replications of the same component, referred to as replicas. All replicas store a complete copy of the system state. When one replica receives a state update, it broadcasts the update in the system. After it receives an acknowledgment of the new state from the other replicas, it seals the state. In case, the enclave crashes before it seals the state, it can retrieve the state from the other replicas. Hence, liveness is not an issue, as an enclave can recover the state from the other replicas if at least one instance is running. Additionally, distributed systems of multiple replicas usually do not seal state to prevent rollback attacks.

Figure 6A:
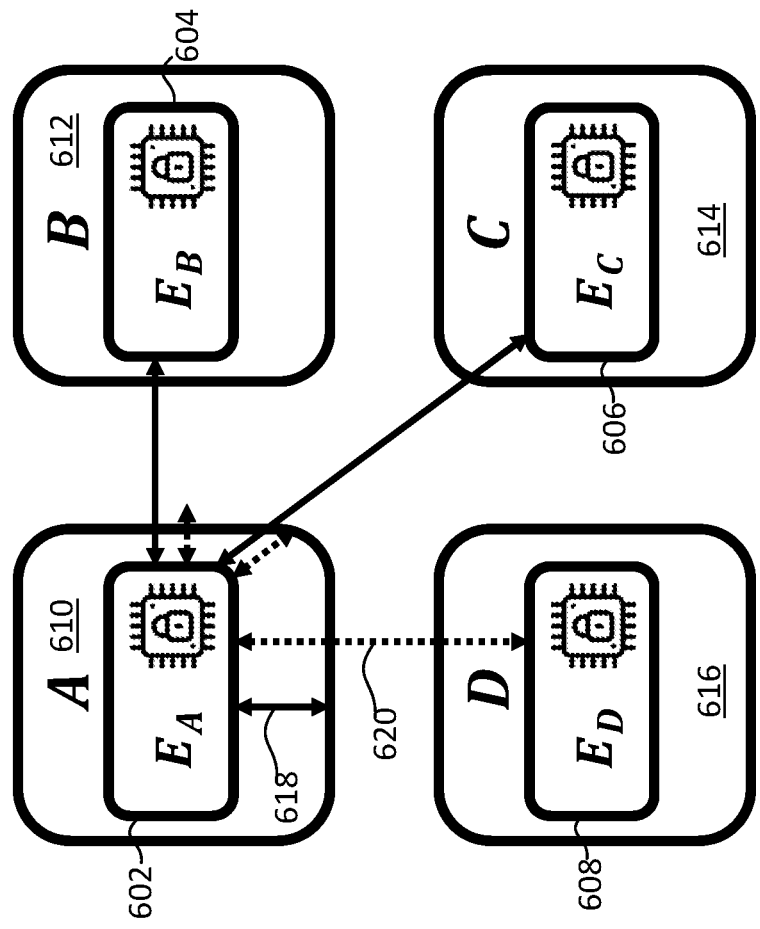
FIGS. 6a and 6b depict forking attacks in a distributed system with four enclaves that do not implement a quorum.
Figure 6B:
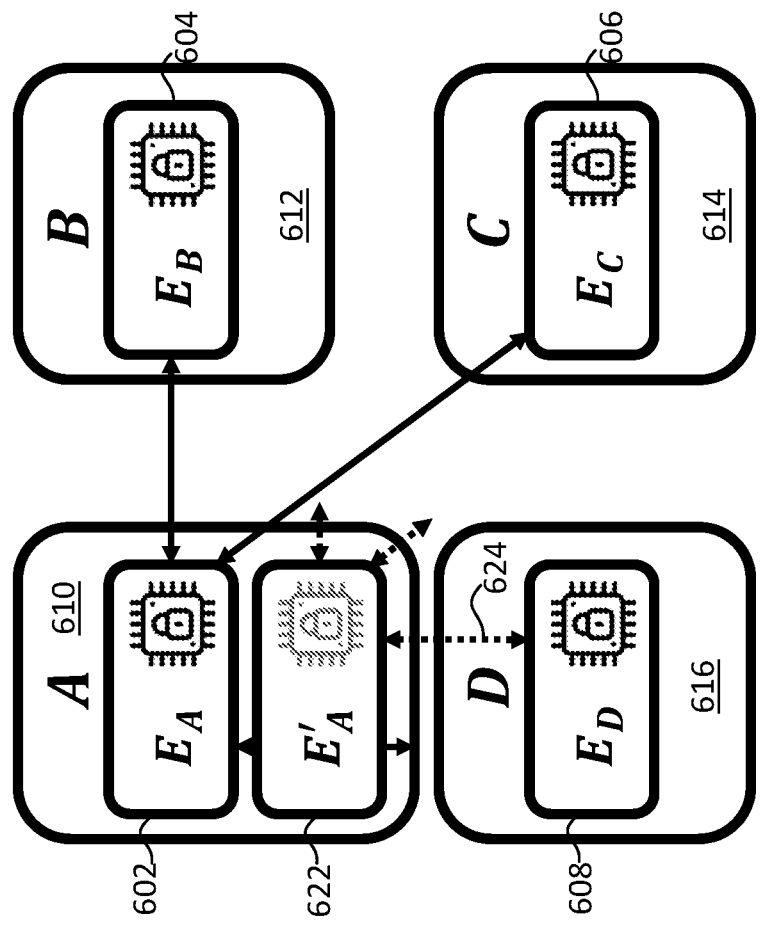

In a distributed system without further precautions, an adversary controlling one of the host machines can mount a rollback or forking attack as shown in FIG. 6 ((a) Overview of a rollback attack and (b) Overview of a cloning attack). Assume a distributed system with four enclaves, $E_A$, $E_B$, $E_C$, and $E_D$ (602, 604, 606, and 608, respectively). The adversary controls A 610, i.e., the platform hosting $E_A$ 6-2. Platforms B, C, and D (612, 614, and 616, respectively) are honest. $E_A$ 602 receives a state update and broadcasts it to the other enclaves (604-608) in the distributed system. The adversary (A 610) blocks the update message (618) to D 616 such that $E_D$ 608 does not receive the state update and keeps a stale state. To rollback $E_A$ 602, the adversary (A 610) crashes the enclave. When $E_A$ 602 restarts, it sends a broadcast to all enclaves in the system. However, the adversary (A 610) blocks the communication to $E_B$ 604 and $E_C$ 606 such that $E_A$ 602 only receives the stale state 620 from $E_D$ 608, rolling back $E_A$ 602. Instead of crashing $E_A$ 602, the adversary (A 610) can launch a second instance of the enclave on A 610, $E_A'$ 622, and connect 624 this instance to $E_D$ 608 (depicted in (b) Overview of a cloning attack). Afterward, machine A 610 runs two parallel clones of the enclave with different states.

A similar attack is possible if the host platform is compromised, e.g., the root key was leaked. If an adversary has access to the root key, they can generate valid quotes with any desired MRENCLAVE (enclave measurement in SGX) for arbitrary code. When an enclave restarts after a crash or due to cloning, the adversary can provide the restarting enclave with an arbitrary state. Here, the adversary can clone the enclave or roll back its state, among other attacks.

The attacks described above are possible because the restarting enclave restores its state using the response of only one enclave. Hence, implementations of distributed systems, e.g., Rollback Protection for Trusted Execution (ROTE) and NARRATOR, enforce a quorum of responses required to validate an enclave's state. In the scenario above, the attacks do not succeed if the enclave waits for two responses instead of restoring the state after one response. Thus, the system administrator can specify a parameter $f$ of how many enclaves an attacker might compromise without harming the system's integrity. Depending on $f$, the system size and the quorum sizes are determined.

CloneBuster is a clone-detection mechanism that allows enclaves to detect if a parallel instance of the same enclave is running on the platform. For the detection of clones, the mechanism deploys a cache-based covert channel. Each enclave writes to the L3 cache following a specified pattern, i.e., to a defined group of cache sets. The enclave controls the virtual address space. Here, six bits do not change during address translation. Thus, the enclave can fix six bits of a physical address, reducing the possible cache sets. The enclave builds eviction sets for these cache sets. For each cache set, it determines a group of virtual addresses that map to the cache set once converted to physical addresses. It continuously accesses virtual addresses from the eviction sets, loading them into the cache and signaling its presence. If another instance of the same enclave runs on the platform, it evicts the address accessed by the first instance from the cache. When the first instance re-accesses its address, there is a cache miss and, thus, a higher latency until the data is loaded is observed. Consequently, monitoring the access time enables an enclave to detect clones.

Additionally, the writing pattern can be modified so that a defined number of clones can run in parallel. If the number of clones exceeds the predefined threshold, the clones evict each other's data, and a clone is detected.

In contrast to other cloning-detection mechanisms, Clone-Buster does not require an external party, and the enclave can self-detect clones without interaction with another component. However, CloneBuster does not provide rollback protection. An additional mechanism, e.g., monotonic counters, is required if an application secured with CloneBuster requires rollback protection.

Rollback Protection for Trusted Execution (ROTE) is a distributed antiforking solution. The design leverages Rollback Enclaves (REs) distributed among multiple platforms to provide MCs for Application Enclaves (AEs). ROTE can potentially protect AEs deploying the service against rollback and cloning attacks.

The administrator of a ROTE system can configure three security parameters, determining the number of REs in the system:

$f$: The number of compromised processors the system can tolerate without harming its integrity.

u: The number of platforms that can be unavailable at a time without harming system availability n: The total number of platforms hosting an RE in the system. This value has a lower bound n≥$f$+2u+1 of REs required to ensure the security guarantees.

From the configurable parameters, the system derives the quorum q=u+$f$+1. An RE must receive q responses from the other enclaves in the system before a state update becomes effective. Otherwise, it might have been rollbacked or cloned and must not accept any state update. The quorum size is constrained by q≥n/2 to preserve the security guarantees.

Each ROTE instance has a group owner. The group owner is a trusted authority that attests all Rollback Enclaves at system initialization. The role of the group owner is to ensure that only REs that execute the correct code on an SGX-enabled platform can join the group. Each RE samples a random key pair when it starts for the first time. The RE then seals the key pair and sends the public key to the group owner. The group owner signs a certificate containing all public keys of the attested REs and distributes it to the enclaves. To prevent system re-initialization, the group owner sends a secret initialization key with the certificate, which the REs use to verify the freshness of the received certificate. The REs then establish a session key with each RE certified by the group owner, generating a trusted group. The SGX attestation mechanism does not allow identifying the platform that created a certificate. If he establishes the trusted group of REs among pre-defined platforms, the group owner must trust the OSs of the joining platforms during system initialization. Otherwise, the group owner can deploy linkable attestation to ensure each RE runs on a distinct platform.

Each RE stores two states, a persistent state and a volatile state. The persistent state is sealed to the disk and contains an RE MC value, the other REs' public keys, and the state of the connected REs. The Rollback Enclaves leverage MCs to secure their states against rollback attacks. Each RE stores the monotonic counter of the other REs in its runtime memory. The REs use session keys instead of public keys to communicate. When an RE restarts, it establishes new session keys with the other REs in the system. The renewal of session keys ensures that only one instance of the RE is active in the system. If two instances run in parallel on the same host, one instance has a stale session key such that it cannot communicate with the other REs. The restarting RE unseals its state and retrieves the MC. The other REs validate the MC value and return their runtime state. The RE waits for q responses and chooses the highest MC value for each RE to store it in its runtime state. However, this restart protocol has a flaw discovered in that an attacker can exploit to set up a parallel ROTE system, breaking the security guarantees of ROTE. This type of attack is described below.

Figure 7:
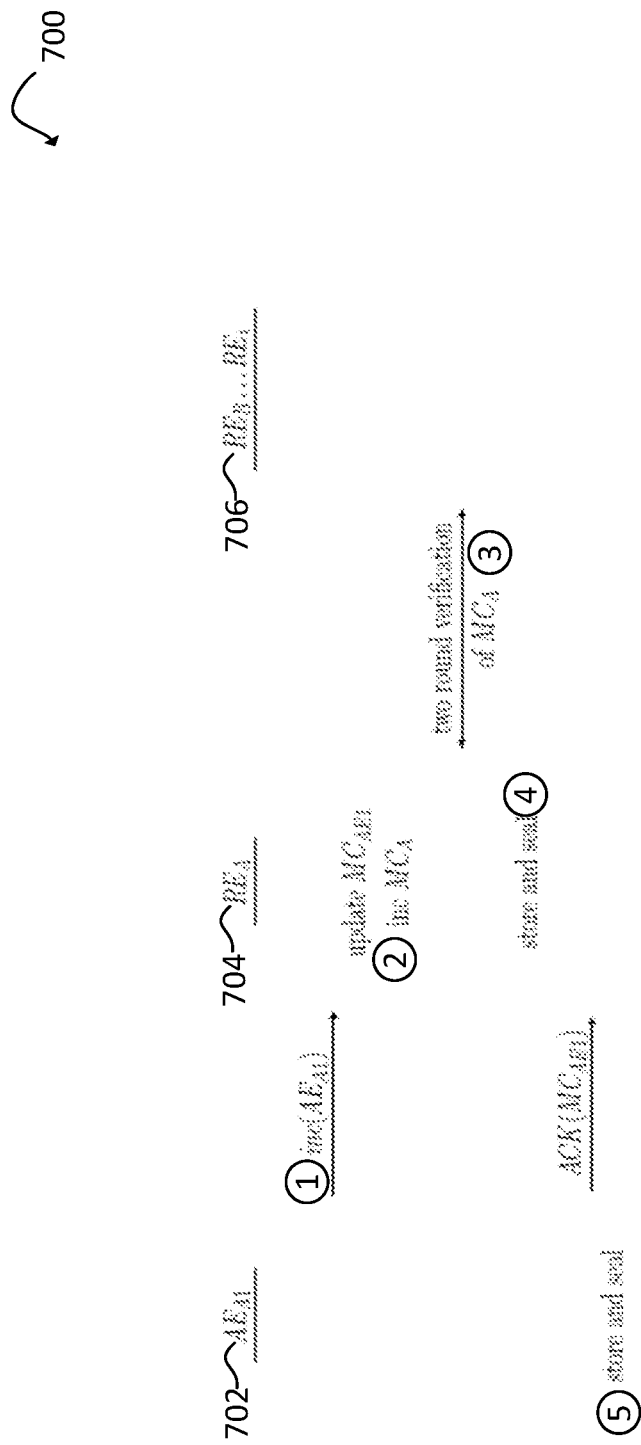
FIG. 7 depicts an Application Enclave (AE) state update of a system using a Rollback Protection for Trusted Execution (ROTE) method.

A simplified version of the state update protocol from ROTE is shown in FIG. 7. To ensure that enclaves cannot be rolled back or cloned, the update mechanism of ROTE deploys the inc-then-store mode. When an Application Enclave, $AE_{A1}$ 702, updates its state, it sends an increment request (Step 1) to the local Rollback Enclave, $RE_A$ 704, to update its MC. The $RE_A$ 704 updates $MC_{AE1}$ (Step 2) and increments its internal MC. Then, the $RE_A$ 704 performs a two-round validation (Step 3) of its MC value with the trusted group (706) to prevent the replay of messages after $RE_A$ 704 restart. After receiving q responses in both rounds, it seals and stores (Step 4) the updated state and returns the incremented counter to the AE 702. After verifying the received counter and after receiving the ACK message, the AE 702 seals its state (Step 5). However, this approach does not provide fault tolerance for the AE 702. The messages between the AE 702 and the local $RE_A$ 704 are encrypted using a symmetric key that both enclaves seal in their persistent state. All communication is protected against replay attacks with nonces, ensuring the freshness of messages.

CloneBuster can provide a mode that allows to run a predefined number of N clones. If N+1 (or more) clones run, the technique detects a clone. ROTE does not support such a mode.

NARRATOR is a distributed anti-forking solution. The system leverages state digests and the record-then-execute technique to protect enclaves from forking attacks. Additionally, NARRATOR leverages a blockchain to replace the trusted authority ROTE requires.

Like ROTE, the NARRATOR system consists of multiple enclaves, called State Enclaves (SEs), that mutually protect their states. An AE can leverage the local NARRATOR SE to protect its state continuity. A Byzantine Fault Tolerance (BFT)-based blockchain backs the REs to prevent the cloning of enclaves at system initialization, removing the need for a trusted authority. An arbitrary SE is elected the leader who is the trusted authority in ROTE. The leader performs mutual attestation with all SEs. Each SE generates a key pair and transmits the public key to the leader SE, which creates and distributes a certificate for the public keys. Since there is no trusted authority, the SEs need to verify that they are not creating a parallel network to an existing network instance. Therefore, each enclave checks that it is uninitialized on the platform. The SE is uninitialized if there is no entry with the respective ID registered on the blockchain. Otherwise, the RE proceeds with the restart protocol.

NARRATOR leverages the record-then-execute mode with State Digests (SDs). An enclave derives the state digest using a hash algorithm, H, using the following formula: $SD_i = H(S_i \| I_i \| r_i)$, where $S_i$ is the current state, $I_i$ is the received input updating $S_i$ to $S_{i+1}$, and $r_i$ is a random value. Before the enclave updates the state with $I_i$, i.e., before it executes, it seals the current state information, $(S_i, I_i, r_i, SD_{i-1})$ and records $SD_i$ to the NARRATOR instance. After the system confirms the record, it starts execution and reveals the output.

The advantage of record-then-execute over inc-then-store is its fault tolerance. If an enclave crashes after incrementing the MC but before storing the data, it cannot recover from the crash because the enclave detects a stale state when using the inc-then-store mode. On the contrary, if an enclave crashes after recording the SD, it can recover from a crash without violating state continuity. At the restart, the OS provides the enclave with sealed data. The enclave unseals the data and requests the latest recorded SD from NARRATOR. It then computes the SD of the unsealed data. If the SDs match, the enclave successfully recorded the state update before terminating and can resume execution with $I_i$. The enclave did not record the state update if the received SD matches $SD_{i-1}$ in the sealed data. In this case, the enclave records $SD_i$ in NARRATOR and executes the input afterward. If the received SD does not match the current or previous SD of the sealed data, the enclave detects a rollback and reacts appropriately. Hence, AEs can resume in case of a fault without violating state continuity. However, this requires the enclave program to be deterministic. Otherwise, an adversary might take advantage by crashing the enclave.

The state read and update protocols of NARRATOR are similar to those deployed in ROTE, with SDs instead of MCs. However, the definition of n and q differs from ROTE. At the system setup, the operator specifies a number $f$ of compromised SEs that the system can tolerate. The total number of enclaves is determined by $n=2f+1$. Consequently, each state update requires $f+1$ responses from the other SEs in the system to become effective.

A flaw exists in NARRATOR, in its restart protocol in particular, in that an adversary can exploit the restart protocol to establish a parallel ROTE network. The adversary can leverage that a Rollback Enclave does not verify that it is an active system member before providing a restarting enclave with its state. NARRATOR specifies an improved restart protocol. Each SE checks its status before responding to a request by a restarting SE. When receiving a join request, the SE pings the other SEs to validate that its session keys are active. If $f+1$ SEs respond and confirm that it is active, the SE sends the current system state, i.e., the SDs of all SEs, to the enclave.

NARRATOR does not support the execution of multiple clones, which is required in scenarios where a service provider provides individual enclave instances for each client.

The next paragraphs describe a case study researching the vulnerability of SGX applications to forking attacks, i.e., rollback and cloning. The methodology is described first and after which examined applications were chosen. Afterwards, the results are presented. Next how to mount cloning attacks on the vulnerable applications is described, followed by a description showing a cloning attack on ROTE. Finally, the results of the analysis are described.

The current disclose describes proposals that leverage Intel SGX to enhance security. The bases for this case study are two repositories providing an extensive collection of SGX-related applications and publications. Both repositories are available on GitHub. The Awesome SGX Open Source Projects repository, which lists SGX-based applications for which the source code is available on GitHub. This repository provides an extensive list of applications that has source code which can be analyzed and does not focus only on academic projects.

All applications from the above noted sources are analyzed, excluding projects from the following categories:

Runtime Frameworks. A runtime or libraryOS is an application container providing different functionalities. Whether an application can be forked does not depend on the container but on the internal and user configuration of the application. Some applications are not vulnerable to forking attacks due to their purpose, while others implement mitigations. The runtime provides an environment for the application that does not specify the design of an application.

Remote Attestation. Remote attestation is a building block of the security guarantees offered by SGX. The attestation process is a message exchange and not an enclave. Hence, a forking attack might profit from how the target application configures the attestation. However, the attestation cannot be forked according to the definition of forking attacks described herein.

Crypto & Common Libraries. The projects listed in these two categories are libraries providing (cryptographic) functions. A library provides functions that an enclave can include but is not an enclave. Hence, a library is not susceptible to forking attacks.

Distributed Systems. The projects listed in this category are libraries and thus excluded for reasons similar to those listed above.

Language Frameworks & Compatibility. The Intel SGX SDK provides an API for C++. The listed language frameworks provide an interface to C/C++ for other programming languages, allowing to leverage SGX functionality in languages other than C++. This interface is not susceptible to forking attacks as it does not keep state and is deterministic, i.e., forking would not change the output. However, applications leveraging these language frameworks might be susceptible to forking attacks.

Profiling & Performance. Programs to profile the performance of applications are usually deployed in the development process and removed from the projects before they are released, and thus excluded from analysis.

Attacks & Defenses. The susceptibility of SGX applications to cloning attacks are investigated.

Beyond SGX Enclaves & Other TEEs. The current disclosure focuses on applications leveraging SGX enclaves and Other Trusted Execution Environments (TEEs) and applications are out of the scope of this disclosure.

As such, the examined applications are from the categories of Blockchains, Machine Learning, Applications, Network, Data Analytics, Private Search, Key and Password Management, and Encrypted Databases and Key-Value Stores.

The results of the analysis from projects filtered by the above criteria provides the following information:

Project: This column states a name for each project for discussions of the projects. The name the authors give the project in the documentation or the GitHub repository is selected. The design documentation is referenced and, if available, the source code for each project. Further, the repository in which the project is found is indicated, the Awesome SGX Open Source Projects repository is denoted by the subscript a, and the sgx-papers repository is represented by p. Some projects are listed by both repositories.

Source code available: This column states whether the source code is available open-source (Yes/No). Some implementations are incomplete (Partially) concerning the enclave described by the design documentation.

Seals state: In the definition of Intel, sealing refers to data encryption using the platform-specific sealing key. The definition used herein is extended and applications that keep a state in untrusted memory encrypted with a key that only the enclave can recover to seal/unseal the state are considered. More specifically, if the enclave seals the key for encrypting the state, the application is considered to be sealing state.

Vulnerable to rollback: This column states whether an application is susceptible to rollback attacks. The design and the implementation are distinguished since multiple implementations not implementing the complete strategy may be found, making them vulnerable to rollback attacks irrespective of the secure design. The cell is marked with a dash (-) if no source code is available.

Some applications are not subject to rollback attacks since there is no benefit for an adversary rolling back the state, i.e., rollback attacks are not applicable (N/A). For applications where rolling back the state is beneficial but mitigated by the enclave are denoted by the mitigation strategy as follows:

MC: a monotonic counter sealed with the data.

DL: a distributed layer that secures the state consistency, e.g., through a consensus protocol.

MT: a Merkle tree of which the enclave keeps the root in its internal memory. Designs that seal the Merkle root secure it with an MC.

Vulnerable to cloning: This column is the counterpart to the previous column and states the susceptibility of a proposal to cloning attacks. The cells are filled following the same principle as the previous columns. Applications with a vulnerable design, where the code is not cloning susceptible, lack the implementation of essential primitives specified in the design. These primitives are essential to mount an attack. Three categories of cloning attacks that apply to the applications that are insecure against cloning are identified: A) forking in-memory key-value stores, B) forking persistent key-value stores, and C) breaking unlinkability guarantees. The category is denoted in the design column if the application is insecure against cloning attacks.

Among the examined applications, 14 applications were susceptible to cloning attacks. Below is a description of how to mount cloning attacks on these applications. The attacks are grouped into three broad categories and the below description describes how each can be instantiated to mount a successful cloning attack on exemplary applications.

Forking In-memory KV Stores: Cloning attacks on in-memory stores, referred to herein as FIM, are first described. Databases (DBs) store vast amounts of data, exceeding the size of the EPC which is limited to 128 MB. Therefore, in-memory databases and key-value (KV) stores, e.g., Aria, Enclage, STANLite, and Avocado, seal their data to persistent memory. To ensure data integrity and rollback protection, the enclave keeps meta-data in its runtime memory where the meta-data is not sealed to persistent storage and its lost if the enclave terminates.

By cloning the enclave, an adversary can provide two views of a KV store. Two clients querying the KV store cannot determine whether they are communicating with the same instance unless a TTP keeps track of an ephemeral enclave ID. The generic cloning attack forking in-memory KV stores is described, considering an honest setting first to show the impact of the attack.

Figure 8:
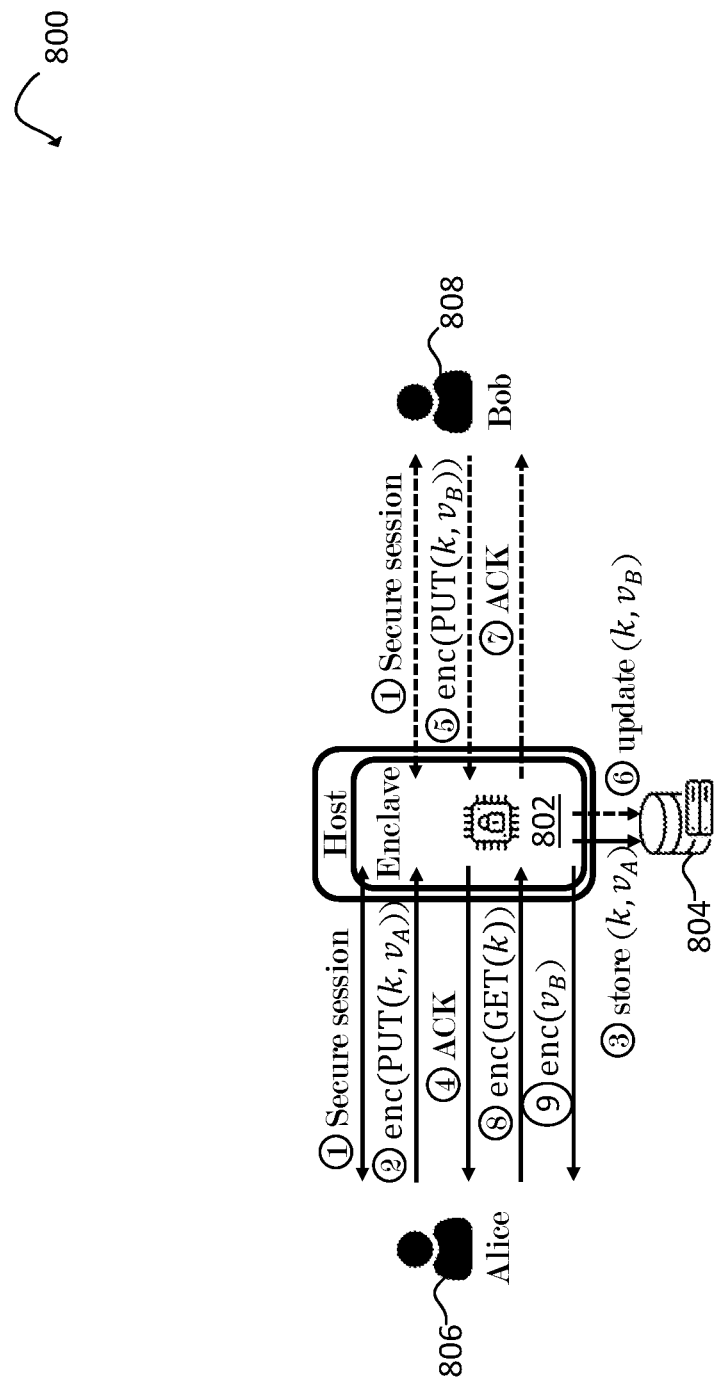
FIG. 8 depicts an overview of an SGX-backed in-memory key-vale store operating in a benign setting.

Assume a server running an enclave-backed KV 802 store 804 that two clients, A 806 and B 808, can access as depicted in FIG. 8. First, both clients 806 and 808 attest the enclave 802 and establish a session key to encrypt their messages (Step 1). All following messages are encrypted using the session key. In a benign setting, A 806 sends a PUT request to post the KV pair (k, vA) to the storage 804 (Step 2). The enclave 802 recognizes that the key k does not exist, creates a new entry with the pair (k, vA) (Step 3), and returns an ACK message (Step 4). Afterward, B 808 sends a PUT request to post the KV pair (k, vB) (Step 5). At this time, the enclave 802 recognizes that the key k exists and updates the value to vB before returning an ACK message (Steps 6 and 7). If A 806 later requests the value associated with k from the KV store (Step 8), it receives the value vB (Step 9).

Figure 9:
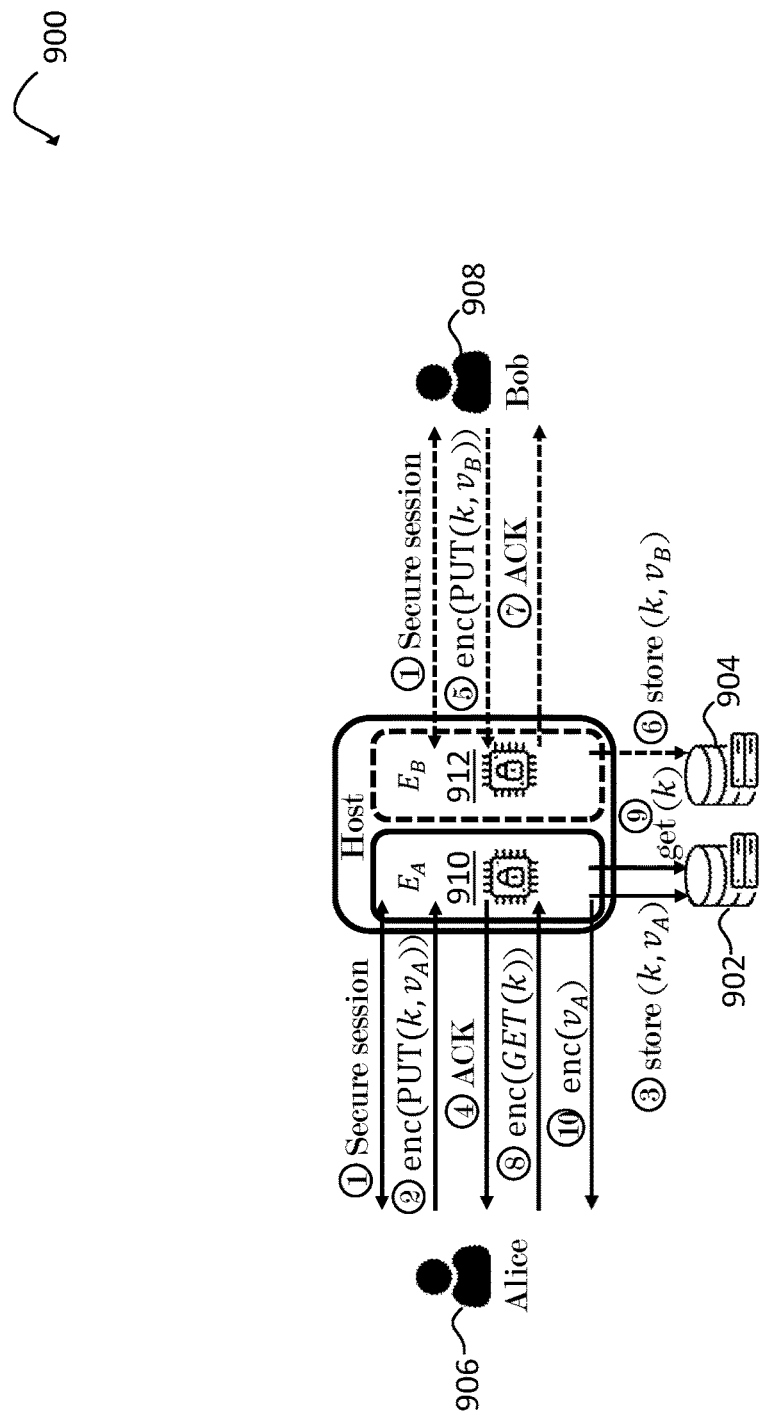
FIG. 9 depicts an overview of a Forking In-memory (FIm) attack on an SGX-backed in-memory key-value store.

In an adversarial setting as depicted in FIG. 9, an adversary can provide two different KV store instances 902 and 904 to A 906 and B 908. The adversary launches two enclave instances, EA 910 and EB 912, and connects each client (906 and 908) to one instance. Each client (906 and 908) attests the connected enclave (Step 1). Assume the same sequence of requests as described with reference to FIG. 8. First, A 906 sends a PUT request to post the KV pair (k, vA) to the storage (Step 2). EA 910 recognizes that k does not exist in the associated storage 902, creates a new entry with the pair (k, vA), and returns an ACK message (Steps 3 and 4). Afterward, client B 908 sends a PUT request to post the KV pair (k, vB) (Step 5). EB 908 does not find an entry for k in the associated memory and creates a new entry for the pair (k, vB) (Step 6). Both clients (906 and 908) receive an ACK reporting the correct execution of their request (Steps 6 and 7). However, if client A 906 later requests the value associated with k, $E_A$ 910 returns $v_A$ which is the latest value it has seen—this is however different from the newest value in the system (Steps 8-10). Honest clients A 906 and B 908 cannot determine to which instance they are connected and cannot distinguish two instances. Note that since the communication with each client (906 and 908) is encrypted with a different session key, an adversary cannot forward the same request to different enclave instances.

As an example, the following describes how to mount a FIm attack against Aria. Aria provides an in-memory KV store in the cloud. Each entry is protected against rollback attacks by an individual MC. For confidentiality, the entries are encrypted with AES (in CTR mode), where the counter value is set to be the current MC value of the entry. The enclave generates a pseudo-random key at initialization and uses the same key for encrypting all data. Additionally, each entry contains a Message Authentication Code (MAC) over the encrypted data for integrity protection. The integrity of the MCs is guaranteed by a Merkle tree structure over all MCs. The enclave exclusively stores the Merkle root in its runtime memory. Additionally, it stores all recently used MCs in its local cache. The cached counters can be used to decrypt entries directly without verifying the Merkle root, thus reducing the latency.

Figure 10:
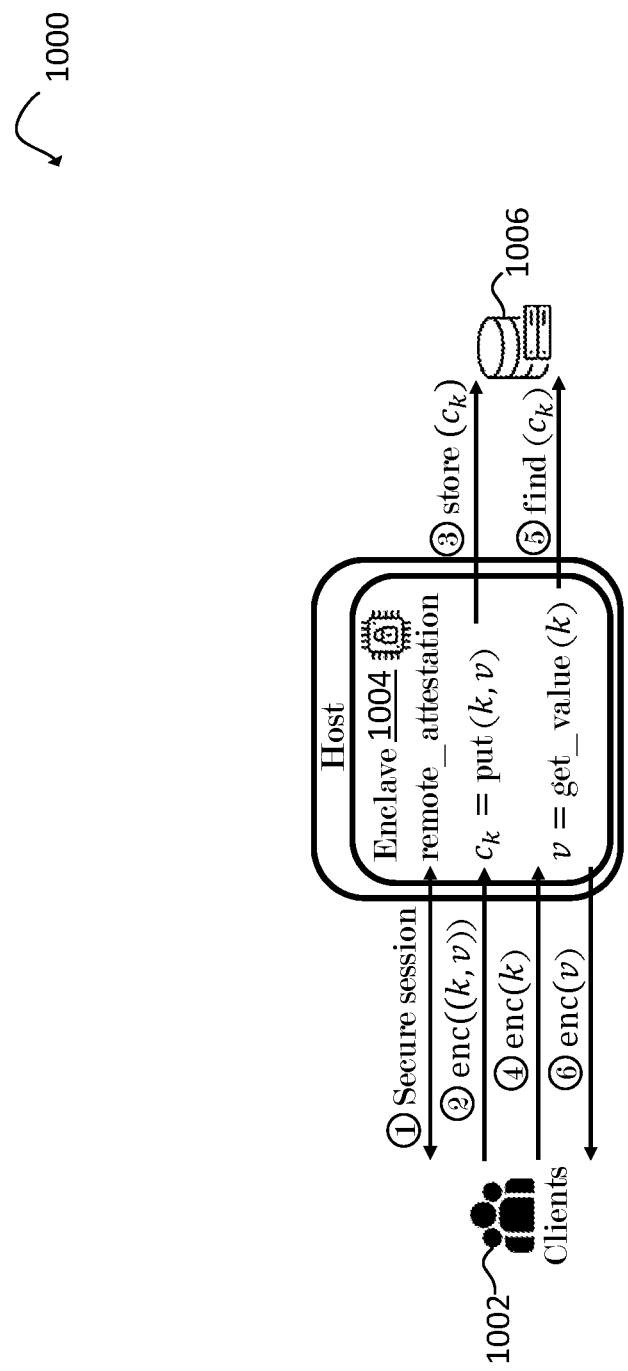
FIG. 10 depicts an overview of the main functions exposed by an Aria enclave and its interaction with clients.

As depicted in FIG. 10, the client 1002 first attests the enclave 1004 and establishes a secure session key (Step 1). The client 1002 sends a PUT request for (k, v), encrypted with the session key as ciphertext $c_p$ (Step 2). The enclave 1004 decrypts the message and checks if k exists in storage 1006. If so, it updates the corresponding counter and encrypted KV pair (Step 3). Otherwise, it assigns the key a free counter and stores it in the database 1006. Later, the client can access v by sending an encrypted GET request, cg (Step 4). The enclave 1004 verifies the counter integrity and decrypts entries until it finds the requested KV pair (Step 5). Finally, it returns v through the secure channel (Step 6).

Figure 11:
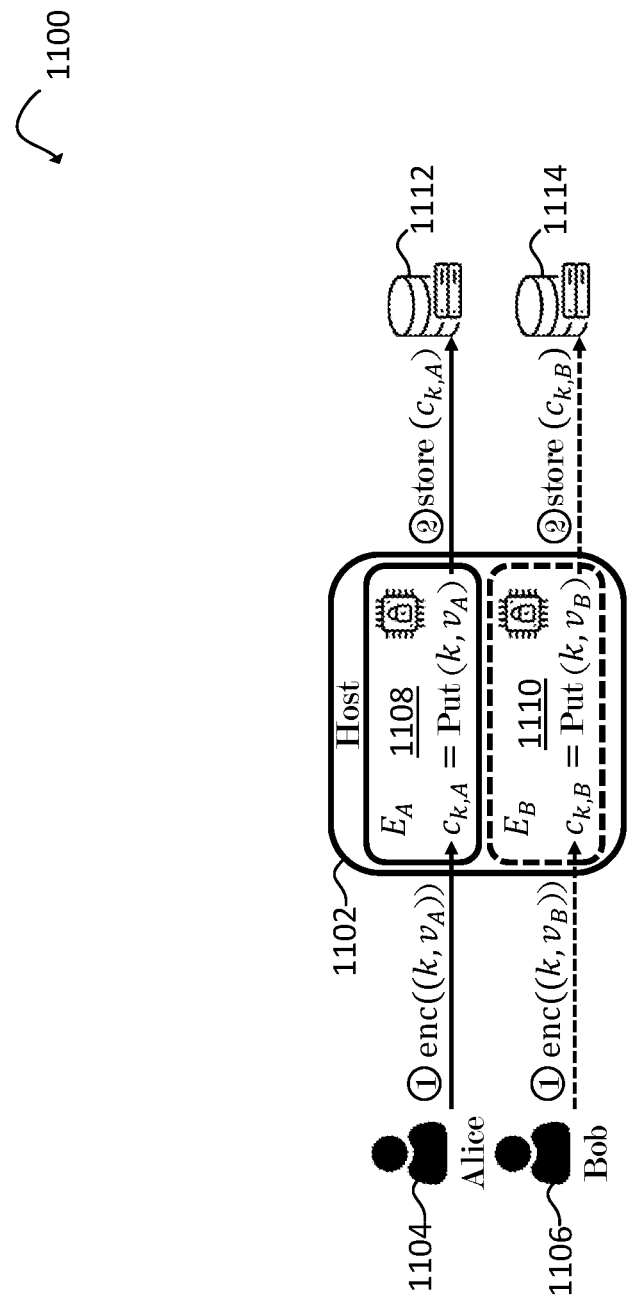
FIG. 11 depicts an overview of a cloning attack against Aria enclaves.

FIG. 11 depicts a scenario with a malicious host 1102 and two clients, A 1104 and B 1106, who share access to the same KV store, e.g., for customer records. As shown in FIG. 11, one can mount FIm attacks on Aria as follows: A) an adversary starts two Aria enclave instances, $E_A$ 1108 and $E_B$ 1110: B) the adversary connects A 1104 to $E_A$ 1108, and B 1106 to $E_B$ 1110; C) the clients A 1104 and B 1106 attest the enclaves 1108 and 1110, respectively, and establish secure communication sessions (Step 1): D) the clients A 1104 and B 1106 send encrypted PUT requests $c_{p,A}$ and $c_{p,B}$ to $E_A$ 1108 and $E_B$ 1110, (Step 1): E) $E_A$ 1108 and $E_B$ 1110 decrypt the requests and create/update the corresponding encrypted entries in the their storage instances 1112 and 1114 (Step 2). A 1104 and B 1106 cannot determine if they are communicating with the same instance. Hence, FIm violates the consistency of Aria by cloning the enclave. The adversary is not limited by the number of enclaves and can run arbitrarily many instances.

The following describes cloning attacks on persistent KV stores, referred to as ForKVS. Persistent KV stores that are susceptible to cloning attacks are EnclaveCache, NeXUS, ObliDB, StealthDB, ShieldStore, SGXKMS, BI-SGX, and CACIC. In contrast to in-memory KV stores, these seal the encryption key and meta-data.

A KV store guarantees that each key in the database is unique and is associated with the latest value. By cloning the enclave, an adversary can break these security guarantees. The generic cloning attack forking persistent KV stores, considering an honest setting is described first.

Figure 12:
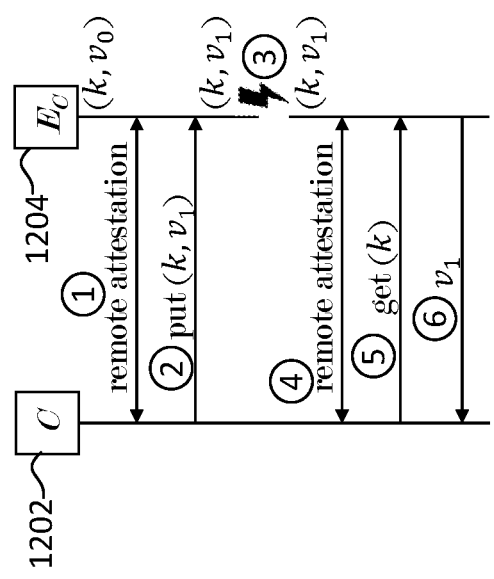
FIG. 12 depicts an overview of an interaction of a persistent key-value store with a client in a benign setting.

Assume a server running an enclave-backed KV store that stores a KV pair (k, $v_0$) when a client, (1202, connects to the system. First, (1202 attests the enclave $E_C$ 1204 and establishes a session key (Step 1). All following messages are encrypted using the session key. In a benign setting as depicted in FIG. 12, C 1202 sends a PUT request to update the value associated with k to $v_1$ (Step 2). $E_C$ 1204 updates the KV pair in its storage (Step 3). Later, E 1204 crashes and needs to restart. It successfully verifies the MC value in the sealed data and restores the KV store. (1202 must attest the restarted enclave 1204 instance and establish new session keys (Step 4). When (1202 requests the value associated with k, the KV store correctly returns the latest value, $v_1$ (Steps 5 and 6).

Figure 13:
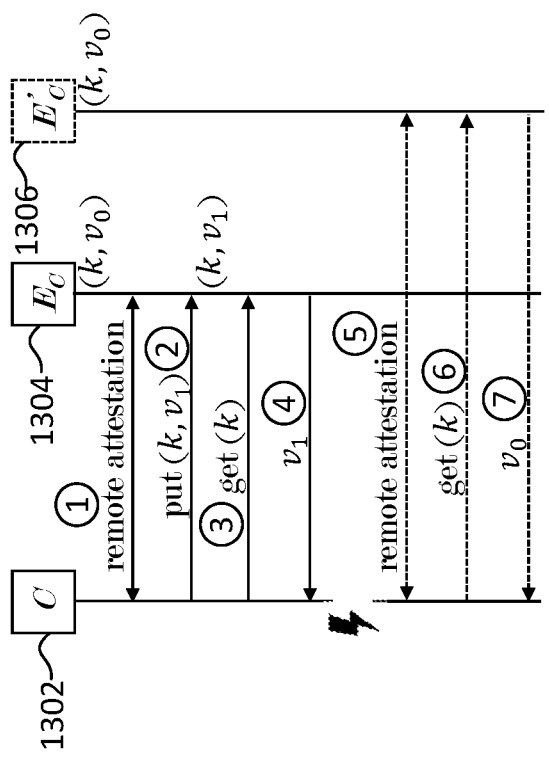
FIG. 13 depicts an overview of a cloning attack on persistent KV stores (ForKVS) attack against persistent key-value stores.

In an adversarial setting as depicted in FIG. 13, an adversary can provide two different views of the same KV store instance to (1302. The adversary launches two enclave instances, $E_C$ 1304 and $E_C'$ 1306. Both instances, 1304 and 1306 have the same initial state storing the KV pair (k, $v_0$). First, the adversary connects (1302 to enclave $E_C$ 1304, and the value is updated to $v_1$ (Steps 1-4). Afterward, the adversary connects (1302 to the second instance, $E_C'$ 1306. (1302 assumes the enclave has crashed and successfully attests $E_C'$ 1306 (Step 5). However, when requesting the value associated with k, $E_C'$ 1306 returns $v_0$, the latest state it stores (Steps 6 and 7). In another session, the adversary connects (1302 to $E_C$ 1304 again and thus, another instance of the KV store. Consequently, the same key is associated with different values in different enclave instances. The same attack holds if multiple clients use the KV store instead of C 1302 connecting to the KV store in different sessions.

Cloning attacks on in-memory KV stores are limited to providing two instances of a KV store. They do not share entries unless the same data is provided to both instances in different sessions. ForKVS is more powerful: two instances of the KV store share common data that has been sealed by the first instance before the second instance starts. Therefore, ForKVS can have the same effect as rollback attacks, even though classical rollback attacks are not possible.

Figure 14:
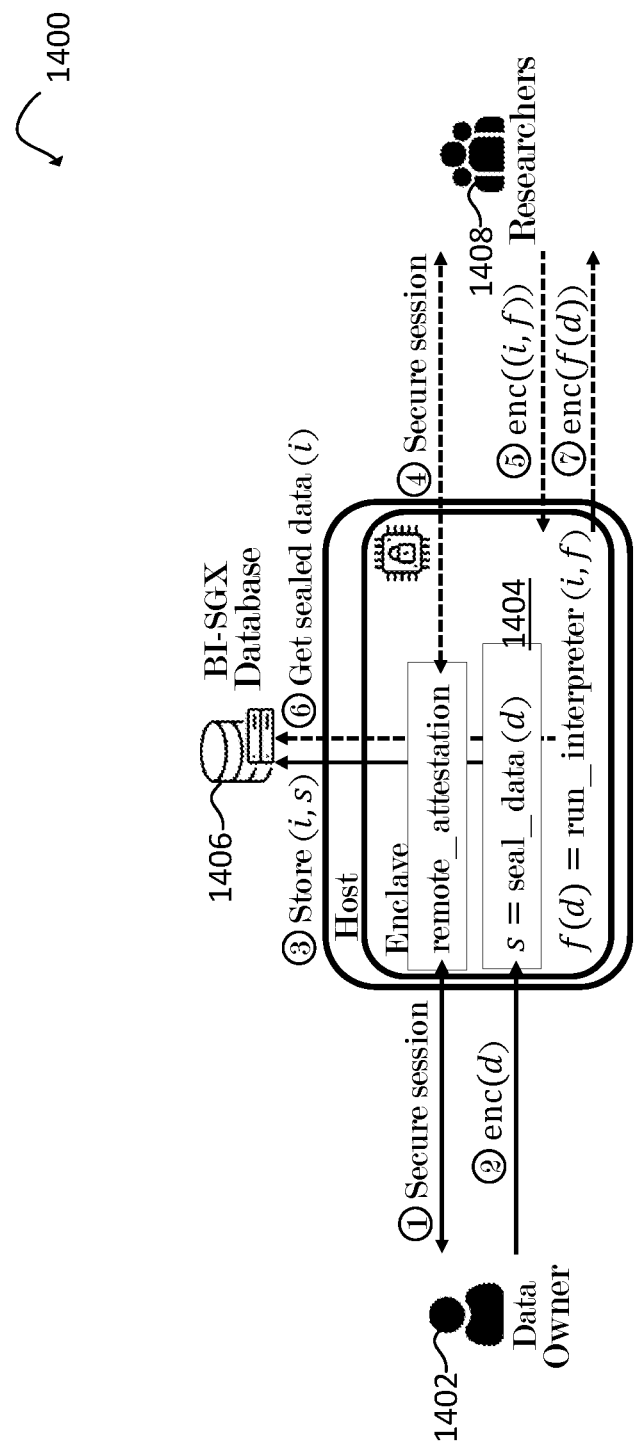
FIG. 14 depicts an overview of the main functions exposed by a system implementing a BI-SGX enclave and its interactions with Data Owners and Researchers.

As an example, the below describes and is illustrated in FIG. 14 how to successfully mount a forking attack based on cloning against BI-SGX. BI-SGX provides secure computation over private data in the cloud by leveraging SGX.

As depicted in FIG. 14, a data-owner 1402 sends to the BI-SGX enclave 1404 data d encrypted as ciphertext $c_o$ (Steps 1 and 2): the encryption key is agreed between the enclave 1404 and the data owner 1402 via remote attestation. The BI-SGX enclave 1404 decrypts the plaintext, seals it, and sends the sealed data (denoted as s) to an external database 1406 (Step 3). The database 1406 stores s along with an index i as a tuple (i, s). Later on, a researcher 1408 can send requests to the enclave 1404: requests include the index that is used to retrieve data from the database 1406 and a description of a function f to be computed over the data. More precisely, a request includes a tuple (i, ƒ) so that if (i, s) exists in the database 1406, the enclave 1404 unseals s and returns ƒ(d) (Steps 4-7).

Queries issued by researchers 1408 (and containing different indexes) should retrieve and process different data or, the other way around, queries containing the same index should process the same data. BI-SGX 1404 cannot guarantee such a property, i.e., an attacker can feed the enclave 1404 with different data even if researchers 1408 submit requests with the same index. The index used for data retrieval is not included in the sealed data but added by the database 1406 when it receives the encrypted data for storage. Upon request issued by the BI-SGX enclave 1404 to retrieve data item with index i, a malicious OS could return any sealed data item: the enclave 1404 has no means to tell if the sealed data returned by the OS is the right one.

This vulnerability has a potential solution that uses monotonic counters to mitigate this attack. The idea is to seal the index of the data along with the data itself. Hence, when the BI-SGX enclaves requests sealed data with index i and obtains a ciphertext Enc(d, j), it only accepts d as valid if i=j. Further, the use of MCs as indexes ensure that not two data items can be stored with the same index.

Figure 15:
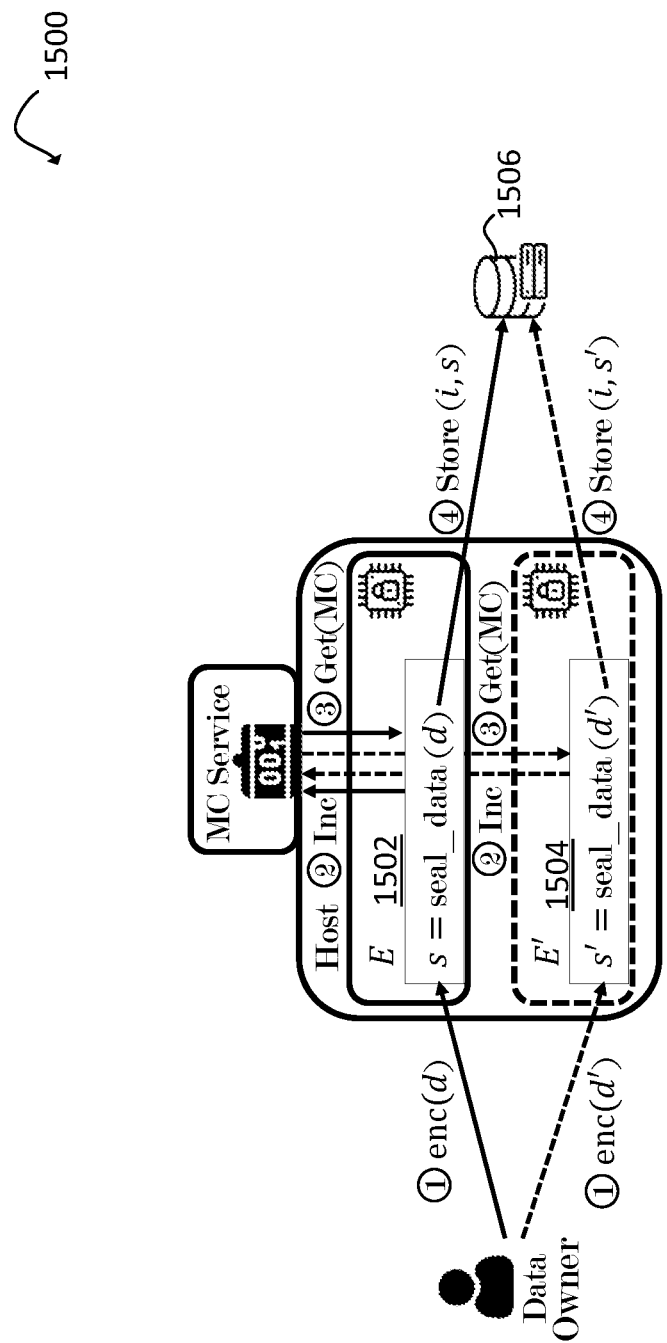
FIG. 15 depicts an overview of a cloning attack against a fixed BI-SGX system.

Assume now a malicious server where even if the fix descried above is implemented and an inc-then-store mode, one can mount a ForKVS attack against BISGX as follows:

An adversary starts two BI-SGX enclave instances 1502 and 1504 as depicted in FIG. 15.

The adversary feeds one data item d to enclave $E_D$ 1502 and another data item d' to enclave $E_D'$ 1504 (Step 1). The current value of the counter is MC.

The adversary stops the instance that first executes Increment (MC) until the other one has also executed it (Step 2). The counter at this state is equal to MC+2. In practice an attacker could use a framework such as SGX-Step.

The adversary allows both instances 1502 and 1504 to proceed. They execute Read(MC) and get exactly the same value of the counter (MC+2) (Step 3).

Instance E_D 1502 seals (d,MC+2) while instance E'D 1504 seals (d',MC+2). Both ciphertexts are sent to the database 1506. Both ciphertexts are valid for a query from a researcher to process data stored at index MC+2, as the BI-SGX enclave only checks if MC in the sealed blob is equal to the index value in the researcher request.

Hence, the attack violates the consistency of BI-SGX by cloning the enclave.

The following describes cloning attacks on SGX proxies, dubbed BUG.

Applications affected by BUG, i.e., X-Search and PrivaTube, provide unlinkability by leveraging an SGX-backed proxy. The proxy receives encrypted requests and obfuscates them, e.g., by adding fake requests, to ensure that an adversary accessing the service cannot link the plaintext requests to individual clients.

By cloning the enclave, an adversary can break the unlinkability and link a request to a specific user or at least reduce the anonymity set. The generic cloning attack for breaking unlinkability guarantees of SGX-backed proxies is described, considering an honest setting first.

Figure 16:
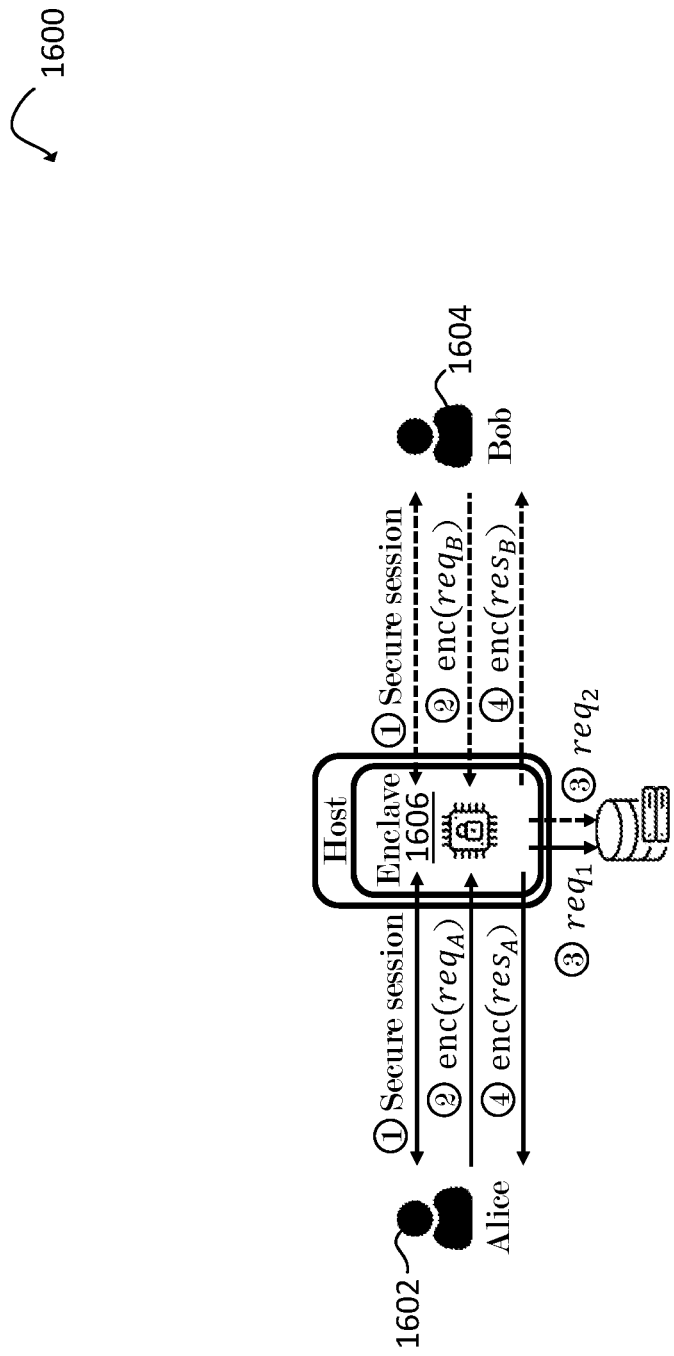
FIG. 16 depicts an overview of a SGX-backed proxy in a benign setting.

Assume a server running an enclave-backed proxy that receives requests from two clients, A 1602 and B 1604, as depicted in FIG. 16. First, both clients 1602 and 1604 attest the enclave 1606 and establish session keys (Step 1). In a benign setting, clients 1602 and 1604 send requests $r_A$ and $r_B$, encrypted as ciphertexts $C_{r,A}$ and $C_{r,B}$, respectively (Step 2). The enclave 1606 decrypts the requests and forwards two (decrypted) requests, $r_1$ and $r_2$, to the untrusted server (Step 3). Afterward, the proxy maps the responses to the client requests, encrypts and forwards them to the corresponding client (Step 4). The server cannot distinguish if A 1602 sent $r_1$ or $r_2$. The anonymity set increases with the number of clients simultaneously connected to the enclave 1606.

Figure 17:
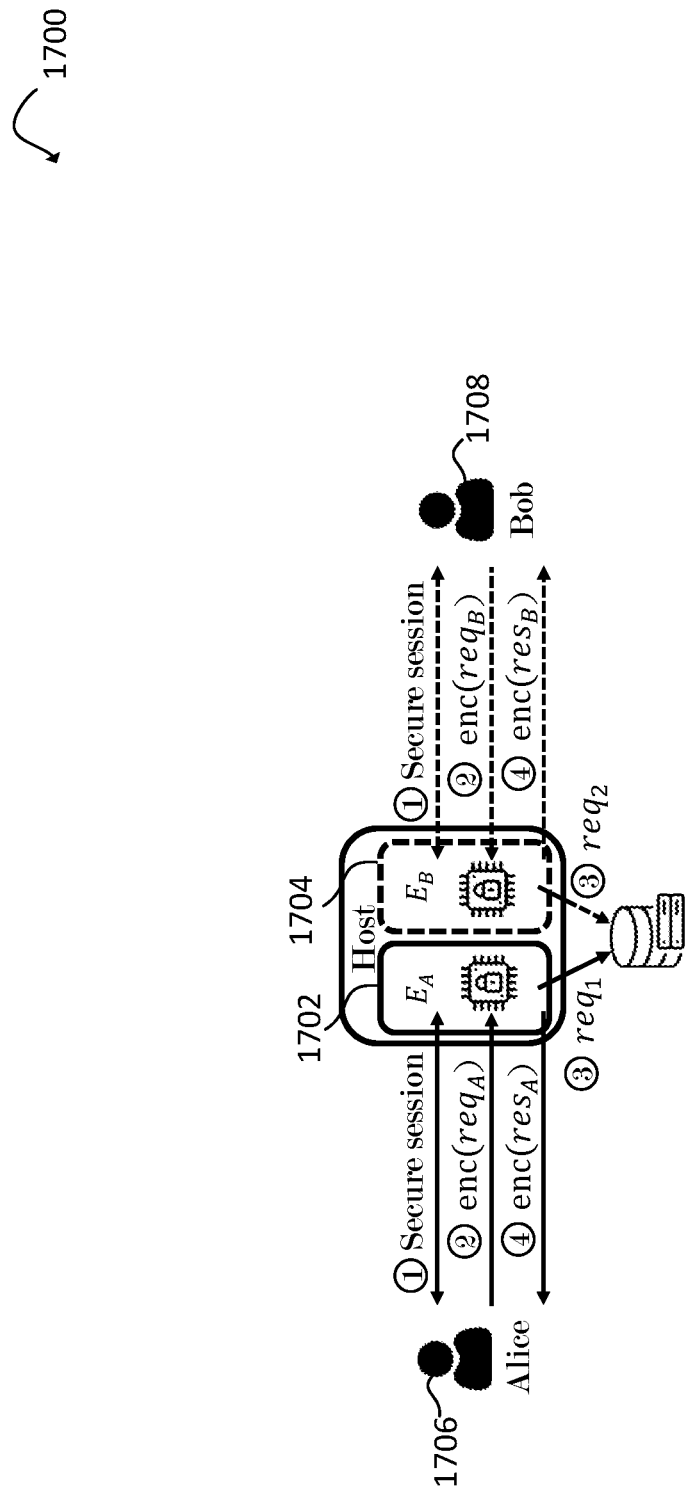
FIG. 17 depicts an overview of a Breaking Unlinkability Guarantees (BUG) attack against an SGX-backed proxy.

In an adversarial setting as depicted in FIG. 17, the adversary can recover the assignment and break the unlinkability guarantee. The adversary starts two proxy enclaves, $E_A$ 1702 and $E_B$ 1704, and connects clients A 1706 and B 1708 to one instance each. The clients 1706 and 1708 attest the connected enclave 1702 and 1704 and send the encrypted requests (Steps 1 and 2). The adversary observes which enclave (either 1702 or 1704) forwards the request to the server, e.g., $E_A$ 1702 sends the request $r_1$. The adversary that connected A 1706 to $E_A$ 1702, thus can infer that A 1706 sent $r_1$ (Steps 3 and 4). Linking the decrypted requests to the clients, the BUG attack breaks the unlinkability guarantee.

How to mount a BUG attack against PrivaTube is now described as an example. PrivaTube is a distributed Video on Demand system leveraging fake requests and SGX enclaves to ensure the unlinkability of requests to individual users. Requests for video segments can be served by video servers and assisting platforms. Assisting platforms are other users that requested a specific video segment in the past and can provide other users with this segment. Each peer in the system hosts an enclave, an HTTP proxy, to break the link between clients and requests.

Figure 18:
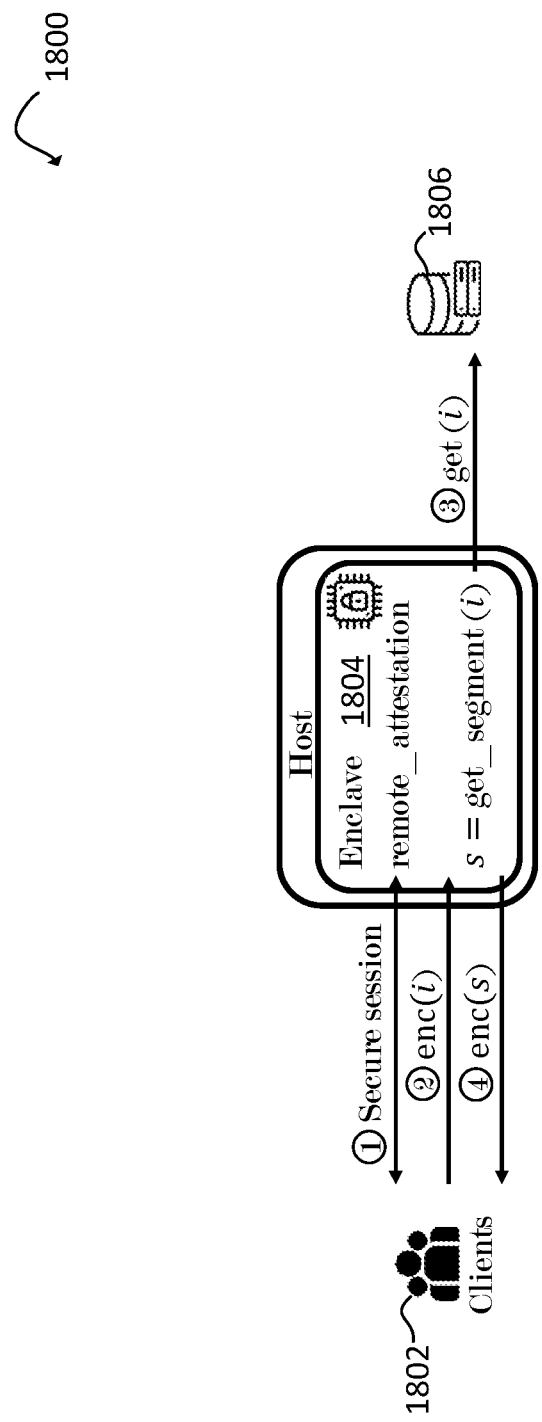
FIG. 18 depicts an overview of the functions exposed by a PrivaTube proxy and its interaction with clients.

As shown in FIG. 18, a client 1802 attests the proxy enclave 1804 and sends a request for a video segment with the ID id, encrypted as c_r (Steps 1 and 2). The enclave 1804 decrypts the segment ID and requests the video segment from the peer's video database 1806 (Step 3). It (1804) encrypts the received segment s and sends it to the client 1802 (Step 4). PrivaTube assumes that each video server serves multiple requests simultaneously, thus preventing the precise assignment of users to requested video segments.

Figure 19:
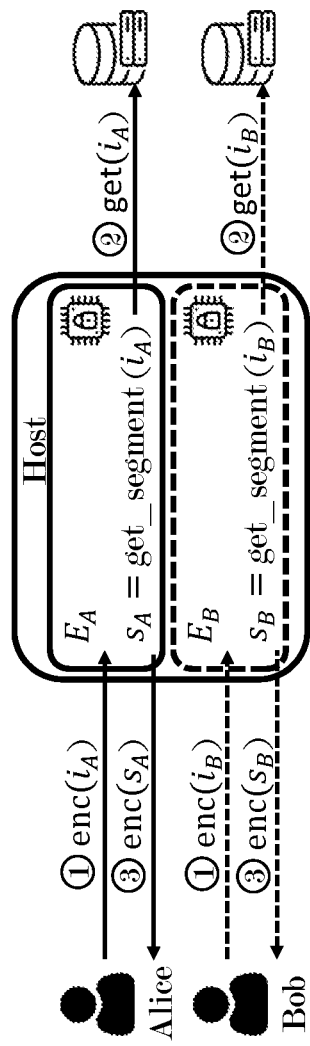
FIG. 19 depicts an overview of a cloning attack against a PrivaTube proxy.
Figure 20A:
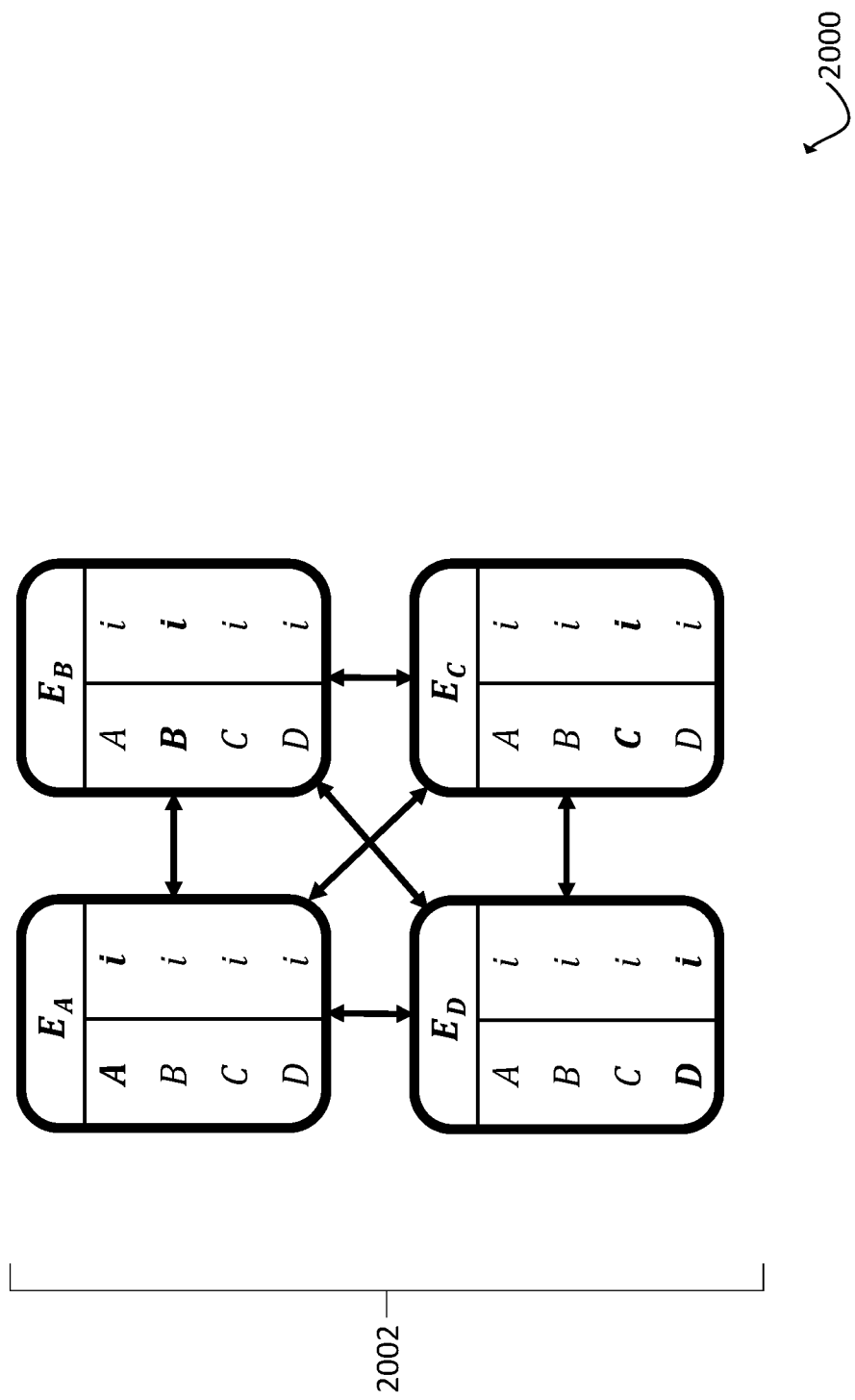
FIGS. 20a-20e depict an overview of an attack to clone a ROTE network.
Figure 20B:
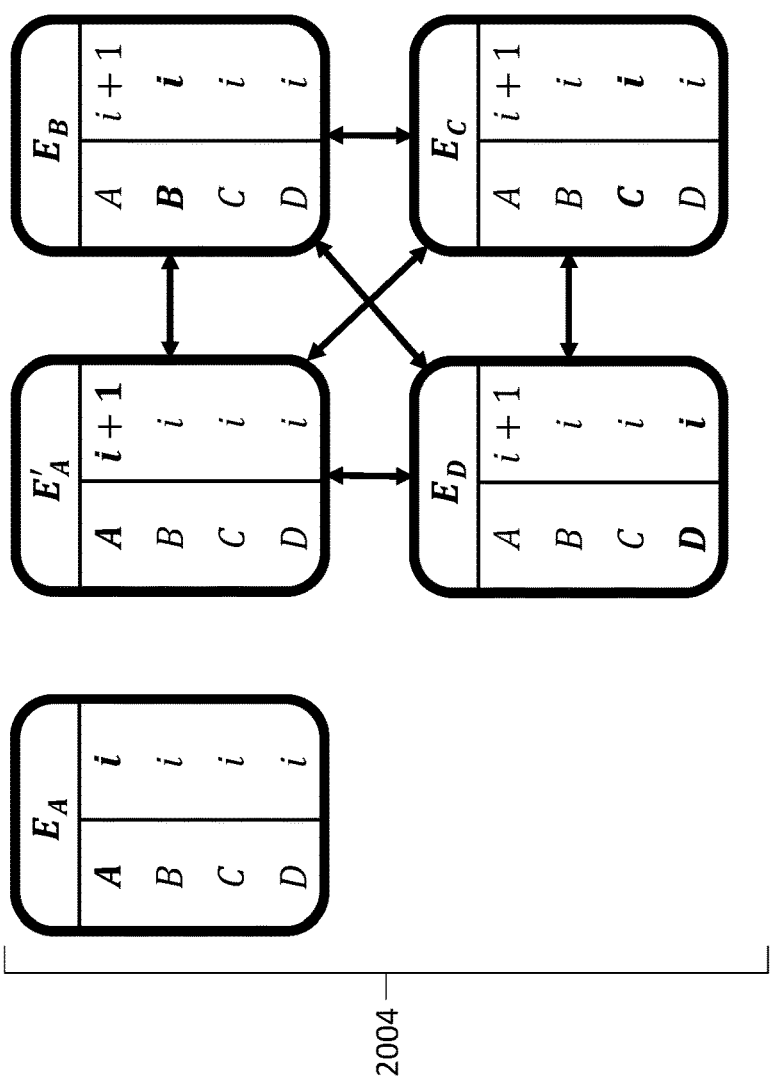
Figure 20C:
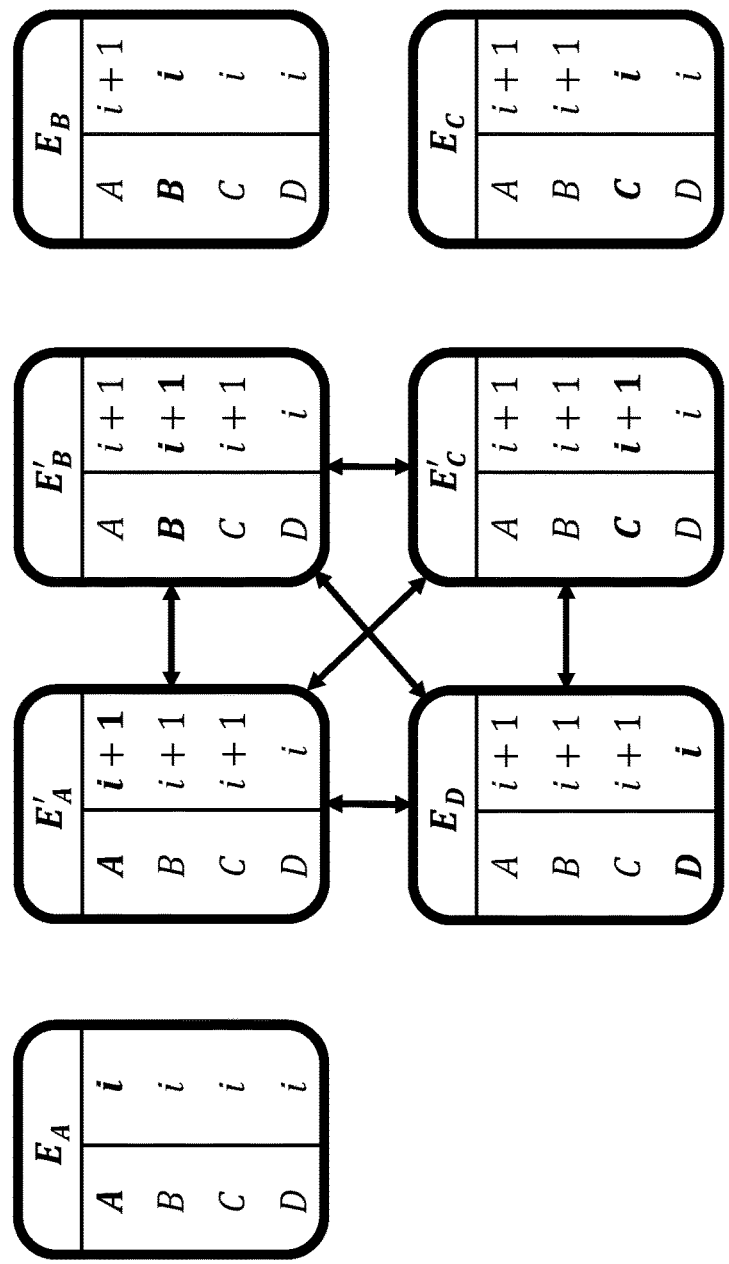
Figure 20D:
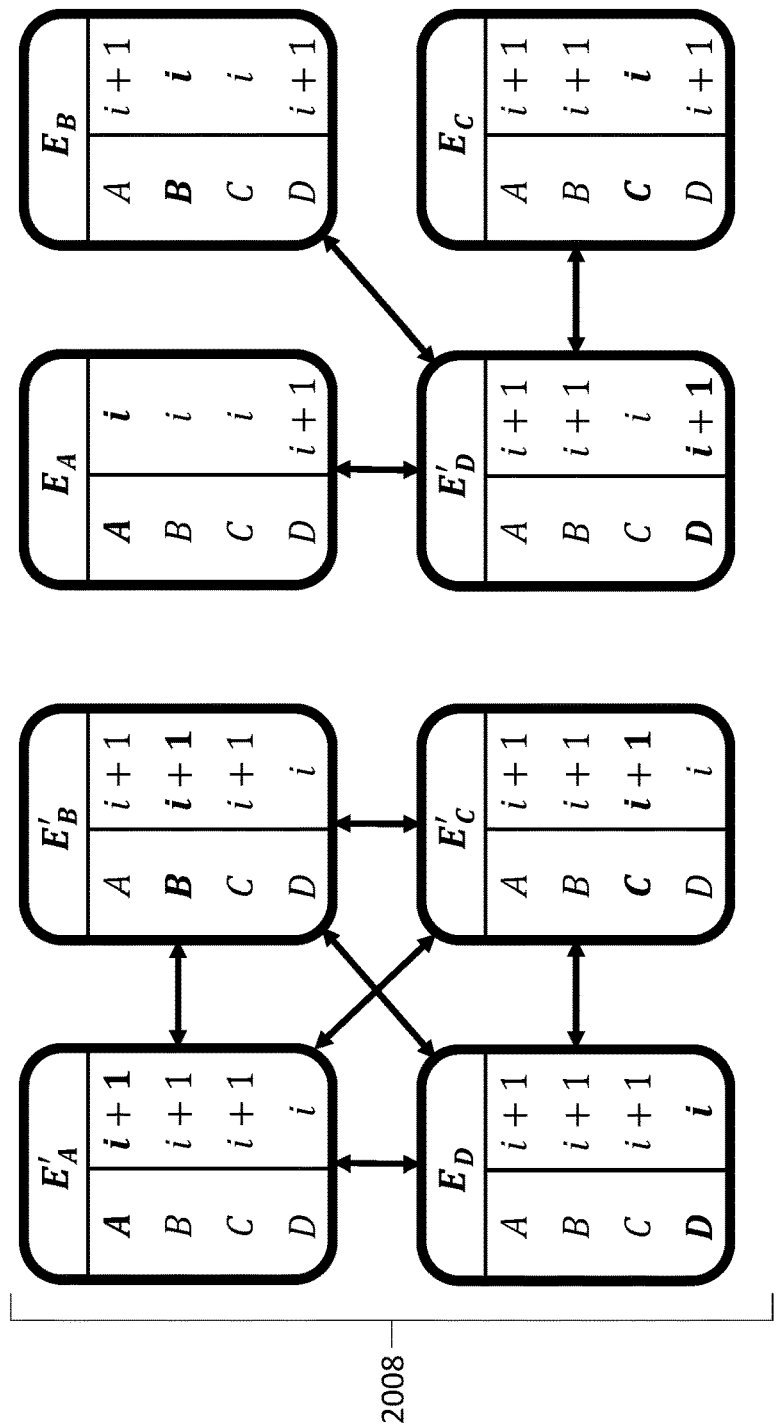
Figure 20E:
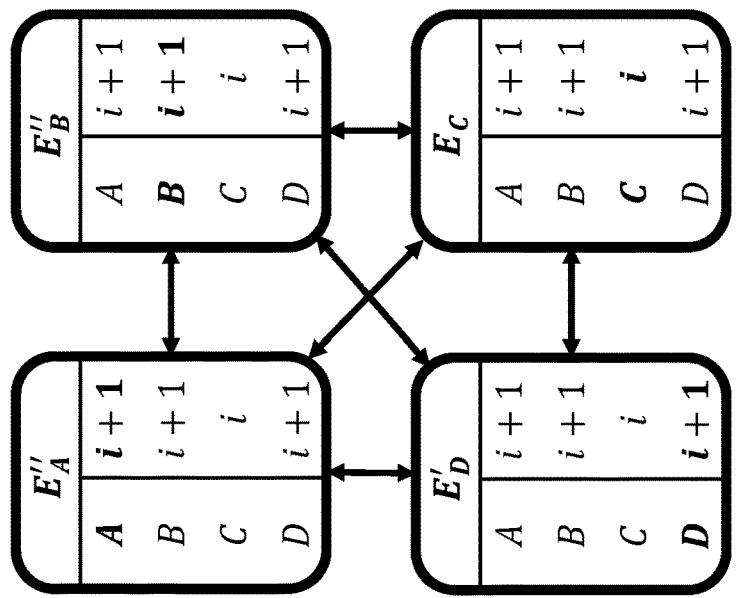
Figure 20E:
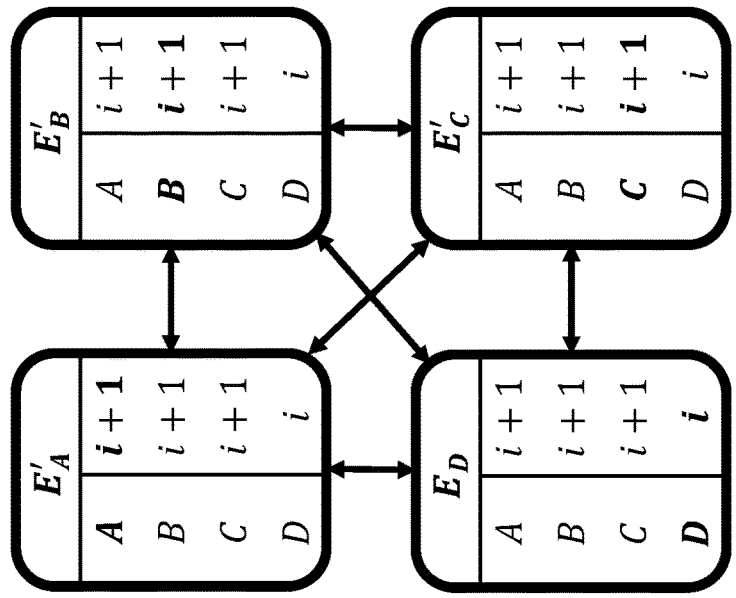

Assume now a malicious video server and two users, A 1902 and B 1904 as shown in FIG. 19. One can mount a BUG attack on PrivaTube proxies as follows:

An adversary starts two proxy enclave instances, $E_A$ 1906 and $E_B$ 1908.

The adversary connects A 1902 to $E_A$ 1906, and B 1904 to $E_B$ 1908.

The clients 1902 and 1904 attest the enclaves 1906 and 1908 and establish secure communication sessions.

The clients 1902 and 1904 send encrypted requests c_(R, A) and c_(R,B) to $E_A$ 1906 and $E_B$ 1908, respectively (Step 1).

The adversary observes the decrypted requests for id_A and id_B to the databases 1910 and 1912, issued by $E_A$ 1906 and $E_B$ 1908, respectively (Step 2).

Knowing A 1902 is connected to $E_A$ 1906 and B 1904 is connected to $E_B$ 1908, the adversary can recover that A 1902 requested the video segment id_A and B 1904 requested id_B (Step 3). Both requests are served correctly. Further, A 1902 and B 1904 cannot determine that they are connected to different proxies.

In the above scenario, the adversary is not limited by the amount of enclaves it can execute at the same time. For every client requesting the video server, the adversary can start a new enclave, precisely recovering the assignment of requested video segments to clients. Here, the unlinkability guarantee is broken.

ROTE is a system that provides rollback protection by securing monotonic counters. The authors of ROTE claim that an Application Enclave receiving a counter value from a Rollback Enclave can trust it to be the latest counter value any instance of the same enclave on the same platform has ever used to secure its state. However, launching a cloning attack on the REs in a ROTE system allows forking states.

For example, ROTE presents an attack that exploits a flaw in the bootstrap protocol. For this attack, there must be enough control over the ROTE machines to be capable of starting arbitrarily many RE enclaves. Suppose a ROTE system with security parameters $u=f=1$. Thereby getting $n=f+2u+1=4$, and $q=u+f+1=3$ (cf. Section 1.3). Consequently, the system has four RES, A. B. C, and D, running on different platforms.

The attack is shown in FIG. 20. Each enclave maintains a list of the MCs for all four REs. The MC it stores for itself, marked bold, corresponds to the counter in the sealed state. For simplicity, this depiction and description assumes that all MCs in the system are initialized to I at the beginning of the attack. FIG. 20 (2002) ((a) initial state) represents the network before the attack. An adversary can form a parallel network as follows:

- The adversary isolates the REs and blocks all incoming requests from AEs to the ROTE network until the parallel network is functional.
- The adversary clones EA and connect the enclave $E_A'$ to the network $E_B$, $E_C$, and $E_D$ using the bootstrap protocol. $E_A'$ receives $q=3$ non-zero states from the other REs. The RE stores and seals the updated state in this scenario. However, the protocol does not include an increment of the MC or describe any other changes to the sealed state. Assuming the worst case for an attacker, where the RE increments the MC and seals its state with the updated MC. In this setting, the MC for $E_A'$ is incremented to i+1 in the runtime memory of all enclaves. After the completion of the bootstrap protocol, $E_A$ has stale keys and cannot communicate with the other nodes but still maintains the (stale) state as depicted in FIG. 20 (2004) ((b) first RE cloned).
- The adversary clones $E_B$ and $E_C$ 2006 as above 2004 ((c) all REs cloned). The nodes $E_A$, $E_B$, and $E_C$ cannot communicate with each other and maintain different states.
- The adversary clones $E_D$ and connects the clone, $E_D'$, to $E_A$, $E_B$, and $E_C$. $E_D'$ can now communicate with the other enclaves since they have a partially stale but valid state and, according to the protocol, $E_D'$ picks the highest counter values from the received responses. Consequently, D' is fully functional after completing the bootstrap protocol. However, the other nodes cannot serve any requests since they cannot communicate with each other. Further, the MCs of $E_A$ and $E_B$ (i) do not match the highest MC value stored by $E_D'$ and $E_C$ (i+1) 2008 ((d) parallel network). Thus, they would not reach the quorum to update their state.
- To get a fully functional network of REs, the adversary needs to retrieve the latest state from the cloned instances $E_A'$ and $E'_B$ before D was cloned. This state is equal to the sealed data after the respective clone updated the state at the end of the bootstrap protocol because the network is isolated and receives no other requests. The adversary restarts $E_A$ and $E_B$ in the parallel network to establish session keys between all REs in this network. Now, the adversary has established a second ROTE instance, consisting of the RES $E_A''$, $E_B''$, $E_C$, and $E_D'$ 2010 ((e) functional parallel network).

A malicious cloud provider, CP, running ROTE on their servers can clone the network of REs as described above. The adversary can perform the described steps multiple times to create arbitrarily many parallel networks. Using parallel networks, CP can perform cloning attacks by connecting different instances of the same AE to separate ROTE instances. Additionally, CP can perform rollback attacks by connecting the AE with the rollbacked state to the ROTE instance that maintains the corresponding counter value.

Among the 148 projects that fit into the selected categories described above, 72 projects provide sufficient design documentation to evaluate their susceptibility to rollback and cloning attacks. 19.4% of the examined projects insecure against cloning attacks. Further, applications 9 and 2 secure against rollback and cloning attacks by design but are vulnerable in implementation. For all of these applications, the vulnerability occurs due to lacking implementation of the rollback and cloning mitigations specified in the design.

All Blockchain. Machine Learning. Network, and Data Analytics applications were not subject to cloning attacks included in this analysis.

Blockchain applications are distributed systems that maintain an immutable ledger keeping track of the state. Each state transition requires consensus to become valid. Therefore, these applications are not subject to cloning attacks. A clone can generate a state update that violates state continuity, but the system would not reach a consensus to validate it.

In the category of Machine Learning (ML), projects leverage SGX enclaves to ensure the correct execution of the training or provide model confidentiality and integrity. In a potential cloning attack on ML applications, the attacker clones the enclave and performs the model training twice with the same or different data sets. However, the analyzed ML applications receive the training data over an encrypted session and do not seal them. Thus, a clone does not have access to the data and cannot beneficially use them.

Finally, the Network applications leverage SGX enclaves to implement a secure proxy that verifies packages or creates a secure channel. However, there is no benefit in cloning the applications as they do not keep any state. Whether sending a packet twice is harmful depends on the application processing the packages. Additionally, most applications in this category encrypt traffic with a session key. This standard network communication method prevents two clones from accessing the same data.

In contrast to the categories not subject to cloning, four categories contain projects subject to cloning. The category Encrypted Databases and Key-value Stores sticks out with 64.3% of the examined projects vulnerable to cloning attacks. Additionally, two vulnerable projects from the category Applications, namely CACIC and BI-SGX, can be considered databases as they store encrypted data associated with a key. Companies and institutions outsource databases and key-value stores to enable multiple clients to work on the same database. Leveraging enclaves ensures the confidentiality and integrity of the provided data. However, clients cannot identify the specific enclave instance they are communicating with, which allows a malicious service provider to split the clients' input data into different stores. Per definition, a database stores vast amounts of data that an attack can target. Note that cloning attacks do not break the confidentiality of the stored data.

Excluding the two storage applications from the category Applications, the categories Applications, Private Search, and Key+Password Management contain one project subject to cloning each. Even though the percentages of clonable enclaves range between 10% and 30%, more than one project is needed to conclude the general susceptibility of applications in this category to cloning. Nonetheless, the results show that these applications can be subject to cloning, and developers should pay attention to cloning attacks when designing an application leveraging SGX in these categories.

Of the 148 projects in the considered categories, 55 lack good design documentation at the time of writing, which is a share of 37.2%. Extensive design documentation is required to ensure understanding the underlying design is feasible within an appropriate amount of time. Fundamental flaws in the design remain undetected if it is not appropriately documented. Hence, developers cannot benefit from the findings such that the same mistakes are repeated. Further, this prevents deploying those projects in real-world applications as it is difficult to reason about the security of an application where the design is under-specified.

Additionally, 18 projects were found among the analyzed projects from both repositories to provide no open-source implementation, and 24 projects provide an incomplete implementation for the design, which equals a share of 25% and 33.3%, respectively. Consequently, interested users can thoroughly evaluate only 41.6% of the projects for their security and quickly deploy them in real-world applications within the bounds of the license agreements.

The below paragraphs describe a new TTP-based anti-forking scheme combining CloneBuster with other concepts.

This new scheme uses a cohort of enclaves distributed among various SGX-enabled platforms to provide forking protection to enclaves. Enclaves in the cohort are called System Enclaves (SE): enclaves using the protection from the system are called Application Enclaves (AE) in the following description. The system provides monotonic counters in the inc-then-store mode to AEs. The new scheme optionally provides controlled cloning and fault tolerance mechanisms for AEs.

Figure 21:
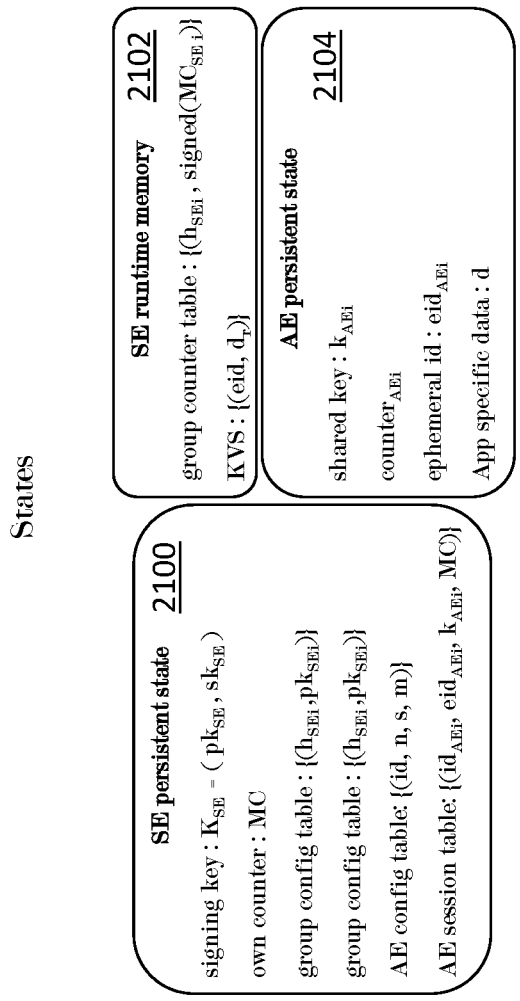
FIG. 21 depicts an overview of a state structure according to embodiments described herein.

A system consists of n=2f+1 SEs, tolerating up to f compromised enclaves or platforms, providing Byzantine Fault Tolerance (BFT). Each SE runs on an individual SGX-enabled platform. Each SE keeps two states, a persistent state 2100 and a runtime state 2102. FIG. 21 depicts a representation of the states in the novel system in embodiments including an AE persistent state 2104. All messages in all protocols are encrypted with the corresponding key. Further, each message includes a nonce to prevent replay attacks. The AE persistent state 2104 uses its keys and counters to make sure the data is fresh.

Figure 22:
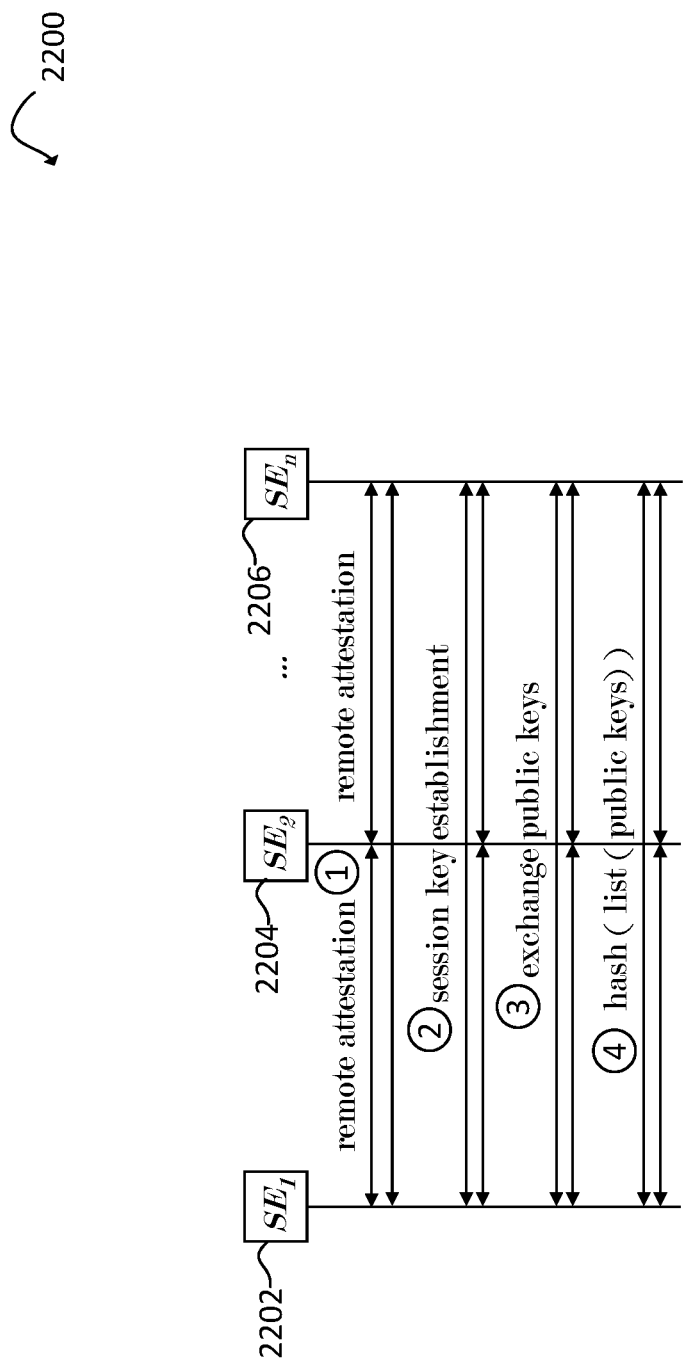
FIG. 22 depicts an overview of a protocol for system initialization according to embodiments described herein.

CloneBuster is used to initialize a TTP-based anti-forking solution without yet another TTP as ROTE or NARRATOR requires. In a nutshell, an enclave being initialized to join the cohort uses CloneBuster to ensure that no clone on the same platform is also being initialized. The following procedure depicted in FIG. 22 replaces the need for a blockchain in the initialization process, hence a combination of the initialization protocols from other techniques with CloneBuster:

1) Each host launches an SE.
2) The SE launches CLONEBUSTER, i.e., signals its presence on and monitors the selected channel for n=1. The channel needs to be hardcoded into an updated version of the SE such that the channel is verified as a part of the attestation mechanism and cannot vary for enclaves on the same host.
3) The SE generates a long-term key pair $K_{SE}=(sk_{SE}, pk_{SE})$.
4) The SE seals the key pair $K_{SE}$ to the disk to persist it for restarts.
5) The SEs (2202, 2204, and 2206) mutually attest each other (Step 1).
6) The SE establishes session keys with all other SEs (Step 2). The retrieved session key is used to encrypt all communication. The remote attestation process can include key establishment.
7) The SE sends its public key, $pk_{SE}$, to the other SEs with a hash, h, of its seal key (Step 3). The tuple ($pk_{SE}$, h) serves as an identifier of the SE on that specific platform and prevents another enclave from joining the network with a different public key. In embodiments the seal key is unique per platform and per enclave.
8) The SE stores all received public keys in a list.
9) The SE computes a hash of the list of public keys (including its own public key) and broadcasts it to the SEs via the secure channel (Step 4).
10) The SE verifies that it receives the same hash from all SEs, i.e., that all SEs communicate with the same network. The verification that the SE receives the same hash from all SEs includes a comparison between the hashes received and the computed hash from Step 9. If any of the hashes are different the SE aborts the initialization process.
11) The SE saves the list of public keys, dubbed group configuration table, in its persistent state.
12) The SE creates a monotonic counter in its persistent memory and sets it to zero.
13) The SE seals the persistent state to the disk. If the network is allowed to expand or change members, the SE includes a monotonic counter in inc-then-store mode into the sealed data to prevent rollback attacks.

The SE terminates if any of the above steps fail or the enclave detects a clone. To prevent the network from being cloned at any other time, the SE must never stop running CloneBuster. Otherwise, an adversary could establish a parallel network on the same set of platforms after the initialization of the first network instance.

In an embodiment, an AE first needs to register with the local SE. The AE first locally attests the SE to establish trust. Afterward, the AE establishes a shared key with the SE that the enclaves use to encrypt all communication between the two parties. The AE includes this key in its sealed data. Then, the AE transmits three parameters to the SE: id is the enclave measurement required for identification, and n and s are needed to allow enclave cloning explicitly.

n indicates how many clones with the same binary can run in parallel. If multiple clones are allowed, s determines if the clones share the same state (s=1) or maintain individual states (s=0), the first required for load balancing, the latter for client individual enclave instances. The SE keeps two tables in its persistent state to manage the connected AEs: an AE config table and an AE session table. The AE config table is used to store the configuration details of each AE, i.e., the enclave measurement serves as a persistent id, n is the number of allowed clones, s indicates whether or not the state is shared among clones, and m keeps track of the number of registered clones. The second table, the AE session table, stores information about active clones: the enclave id stored in the configuration table, an ephemeral id (eid), a communication key, and a monotonic counter. The ephemeral id is only needed for AEs where n>1 and can be left empty otherwise.

TheSE scans the config table (AE config table) for an entry with the respective measurement at registration. If such an entry does not exist, it creates a new entry storing the configuration, initializes a new monotonic counter to 0, sets m=1, and stores the respective data in the session table.

The parameters n and s must be hardcoded in the AE such that a client deploying the enclave can verify them when attesting the AE. For example, the parameters n and s may be written as constants in the AE code so that they can subsequently be part of the binary. In another example, if the platform allows it, the parameters n and s may be hardcoded in a configuration file that is also attached with the binary enclave. If the SE finds an entry with the corresponding id in the config table, it verifies the configuration. Registration is only accepted if the configuration received by the AE matches the stored configuration and m<n, i.e., a free slot for yet another clone exists. In that case, m is incremented by one, and a new entry in the session table is created as described above. When creating a new entry for an AE with a configuration n>1, s must be considered. If s=1, all clones access the same counter. Hence, the monotonic counter field for the instance references the same MC as the other instances of the AE. Otherwise, each clone has an individual counter, i.e., an individual monotonic counter.

Figure 23:
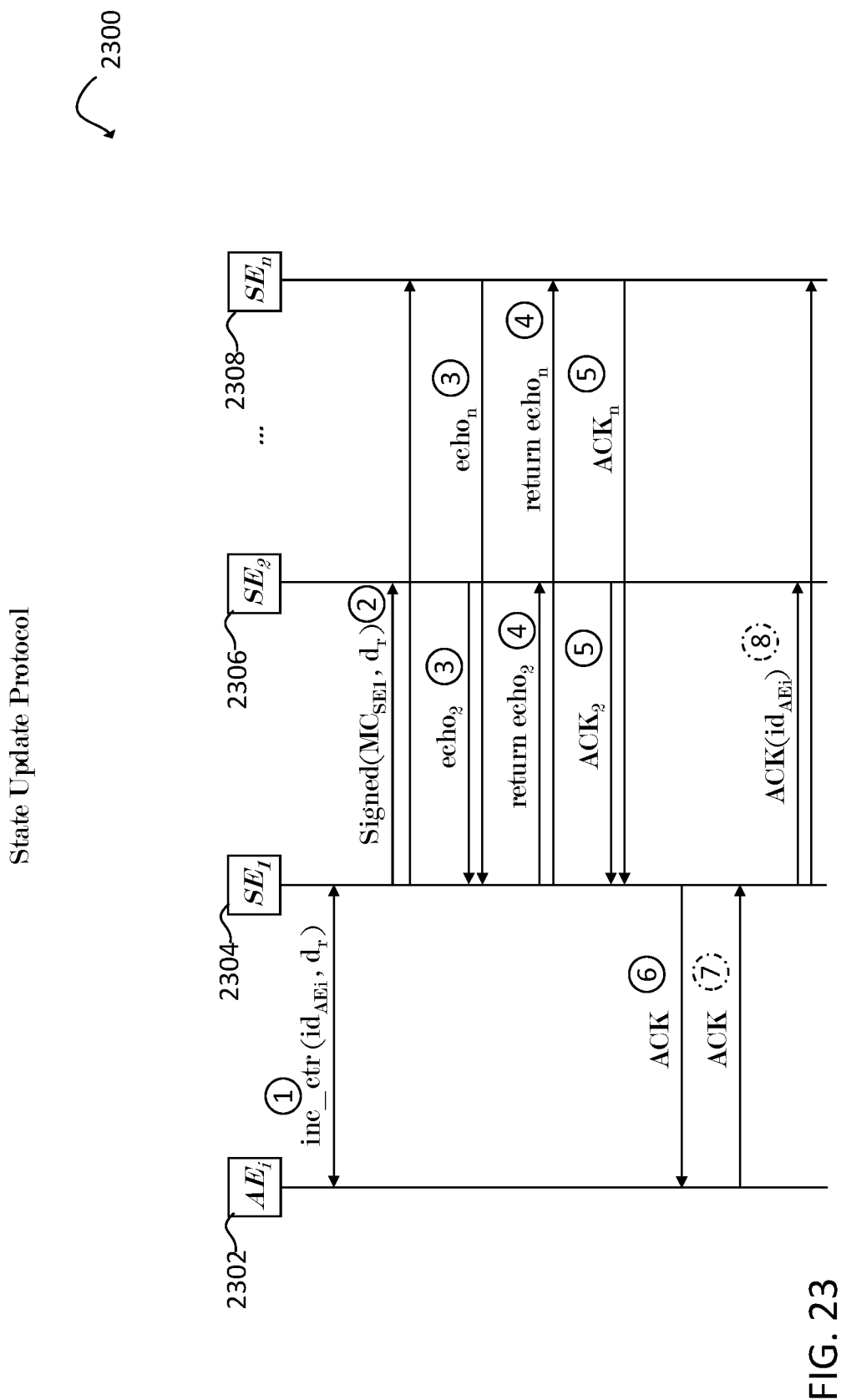
FIG. 23 depicts an overview of a state update protocol according to embodiments described herein.

The protocol for state updating an AE uses some previous methods but updated with additional messages and data to provide optional fault tolerance as depicted in FIG. 23. Some extra steps are described and are optional, i.e., only required if an AE wants to use the fault tolerance service provided by the system (Steps 7 and 8 of FIG. 23). To update its state, an AE triggers the following protocol:

1) The AE 2302 triggers a counter increment using the SE 2304 (Step 1). For security reasons, the MCs are used in inc-then-store mode. For the case where the AE 2302 crashes before the update has been completed, the AE 2302 can optionally include some recovery data d, in the request that it can use in the event of a fault to recover the latest state.
2) The SE 2304 stores the recovery data in an in-memory KVS, increments a counter for the AE 2302, increases its own MC, and signs the MC using $sk_{SE}$.
3) The SE 2304 sends the signed counter and the recovery data to the assisting SEs 2306 and 2308 (Step 2).
4) Upon receiving the signed MC, each SE (2304-2308) updates its group counter table. If required, the SE 2304 stores the recovery data in an in-memory KVS.
5) The SEs 2306 and 2308 that received the counter send an echo message that contains the signed MC (Step 3). The SEs 2306 and 2308 also save the echo in runtime memory for later comparison. In embodiments, an echo message is a message M produced after receiving a message M', such that the content of M includes the content of M' and the destination of M is the sender of M'.
6) After receiving $f+1$ echos, the SE 2304 returns the echos to their senders (Step 4).
7) Upon receiving back the echo, each SE (2304-2308) finds the self-sent echo in its memory and checks if its MC value matches the one in the group counter table and the one received from the target SE 2304. If this is the case, the SE 2304 replies with a final ACK (Steps 5 and 6).
8) After receiving $f+1$ final ACKs, the SE 2304 seals its state together with the MC value to the disk.
9) The SE 2304 returns the incremented AE 2302 counter value. The AE 2302 can now safely perform the state update, save the counter value to its runtime memory and seal its state with the counter.
10) To reduce the overhead of stored data, the AE 2302 sends an ACK message to the SE 2304 after it successfully updated and sealed the state (Step 7). The SE 2304 forwards the ACK, together with the corresponding ephemeral id, to the assisting SEs 2306 and 2308 such that they can delete the entry (Step 8).

Figure 24:
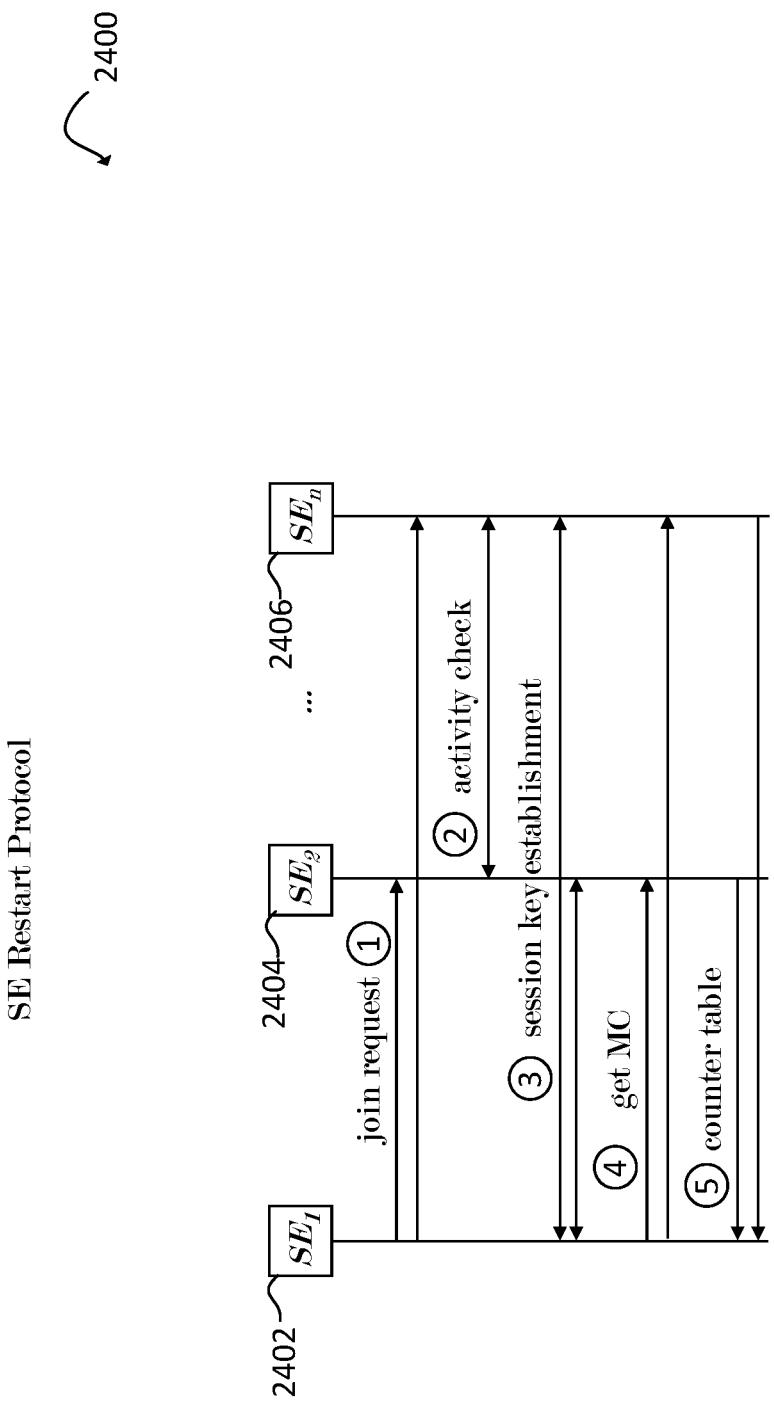
FIG. 24 depicts an overview of an SE restart protocol according to embodiments described herein.

The SE restart protocol, which is depicted in FIG. 24, allows an SE to rejoin the cohort of assisting SEs after it has crashed. In the following description, SE 2402 represents the restarting SE and assisting SEs 2404 and 2406 are other SEs in the cohort of enclaves. The protocol consists of the following steps:

1) The restarting SE 2402 launches CloneBuster to signal its presence and detect clones on the same platform. If it detects a clone at any time, the SE 2402 terminates.
2) The SE 2402 establishes new session keys with the assisting SEs 2404 and 2406. Therefore, the SE 2402 sends a join request to the assisting SEs 2404 and 2406 (Step 1). Before responding to the join request, each assisting SE 2404 and 2406 pings the other assisting SEs 2404 and 2406. If it receives at least $f$ responses from pinged SEs 2404 and 2406, the assisting SE 2404 concludes that it is still active and proceeds to establish a new session key with the restarting SE 2402 (Step 3). In embodiments $f$ is a parameter of the protocol and is defined by a system administrator.
3) The SE 2402 unseals its persistent state and extracts the MC. In embodiments, unsealing a persistent state includes an enclave asking for an encrypted state from an operating system, fetching an unsealing key, and decrypting the encrypted state with the unsealing key.
4) The SE 2402 requests its MC from the assisting SEs 2404 and 2406 (Step 4).
5) The assisting SEs 2404 and 2406 respond with their group counter table, if the table contains the MC for the corresponding SE 2402 (Step 4).
6) The SE 2402 waits until it receives at least $f+1$ responses.
7) For each SE 2402 instance, it extracts the highest counter value from the received responses and fills its group counter table accordingly.
8) The SE 2402 compares the MC in its sealed data with the maximum counter value received from the assisting SEs 2404 and 2406. If there is a mismatch, the SE 2402 terminates.
9) The SE 2402 increments its MC and seals the state according to the state update protocol.

When an AE restarts, it needs to recover its state securely. Therefore, the following steps are performed:

1) The AE unseals its state and retrieves the counter value.
2) The AE requests its MC from the local SE.
3) The SE requests its own MC from the assisting SEs.
4) If the SE receives at least $f+1$ responses and the counter matches the highest received MC, it responds to the AE with the corresponding counter from the AE counter table.
5) The AE verifies its MC with the received information. If the counter in the sealed data is off by one, and the AE uses the fault tolerance mechanism provided by the system, it queries the recovery information from the local SE. Otherwise, it reacts appropriately. In this scenario, reacting appropriately includes not allowing the AE to restart or work normally. If the counter does not match then this indicates that the AE is not in a good state and might have suffered an attack.

In the scenario where n>1, the following steps are performed additionally to the steps above:

When unsealing the state (step 1), the AE generates a new ephemeral id.

The AE includes the old and new ephemeral id in its request (step 2).

For choosing the correct MC to return to the AE (step 4), the SE uses the old ephemeral id to identify the proper MC and replaces the ephemeral id with the new one to ensure that no other restarting instance claims that slot. The old ephemeral id is additionally required to (optionally) retrieve the recovery data from the network (step 5).

Existing TTP-based anti-forking solutions include ROTE and NARRATOR. ROTE has a flaw in its RE restart protocol. Further, ROTE does not provide fault tolerance for AEs in case the RE crashes before the AE has completed the state update. The solutions presented in the current disclosure include the fix for the restart protocol and provides a fault tolerance mechanism based on key-value stores.

Compared to NARRATOR, the solutions presented herein require less computational overhead. In NARRATOR, an AE computes a hash of its state at each state update which can lead to high computational overhead, depending on the state size. Incrementing an MC is not computationally expensive, and the transmission of the recovery data is an optional feature where the AE developer can decide whether or not it is required. Thereby, the solution presented herein reduces the computational overhead compared to NARRATOR.

The solutions described herein additionally provide mechanisms for controlled cloning of AEs which can be required in various scenarios such as load balancing or providing individual enclave instances for each client when compared to previous methods.

Figure 2:
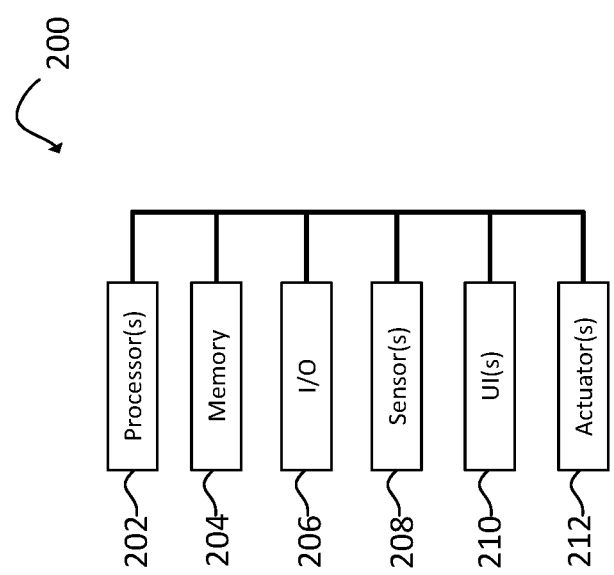
FIG. 2 is a block diagram of an exemplary processing system, which can be configured to perform any and all operations disclosed herein.

Referring to FIG. 2, a processing system 200 can include one or more processors 202, memory 204, one or more input/output devices 206, one or more sensors 208, one or more user interfaces 210, and one or more actuators 212. Processing system 200 can be representative of each computing system disclosed herein.

Processors 202 can include one or more distinct processors, each having one or more cores. Each of the distinct processors can have the same or different structure. Processors 202 can include one or more central processing units (CPUs), one or more graphics processing units (GPUs), circuitry (e.g., application specific integrated circuits (ASICs)), digital signal processors (DSPs), and the like. Processors 202 can be mounted to a common substrate or to multiple different substrates.

Processors 202 are configured to perform a certain function, method, or operation (e.g., are configured to provide for performance of a function, method, or operation) at least when one of the one or more of the distinct processors is capable of performing operations embodying the function, method, or operation. Processors 202 can perform operations embodying the function, method, or operation by, for example, executing code (e.g., interpreting scripts) stored on memory 204 and/or trafficking data through one or more ASICs. Processors 202, and thus processing system 200, can be configured to perform, automatically, any and all functions, methods, and operations disclosed herein. Therefore, processing system 200 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 200 can be configured to perform task "X". Processing system 200 is configured to perform a function, method, or operation at least when processors 202 are configured to do the same.

Memory 204 can include volatile memory, non-volatile memory, and any other medium capable of storing data. Each of the volatile memory, non-volatile memory, and any other type of memory can include multiple different memory devices, located at multiple distinct locations and each having a different structure. Memory 204 can include remotely hosted (e.g., cloud) storage.

Examples of memory 204 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 204.

Input-output devices 206 can include any component for trafficking data such as ports, antennas (i.e., transceivers), printed conductive paths, and the like. Input-output devices 206 can enable wired communication via USB®, Display Port®, HDMI®, Ethernet, and the like. Input-output devices 206 can enable electronic, optical, magnetic, and holographic, communication with suitable memory 206. Input-output devices 206 can enable wireless communication via WiFi®, Bluetooth®, cellular (e.g., LTE®, CDMA®, GSM®) WiMax®, NFC®), GPS, and the like. Input-output devices 206 can include wired and/or wireless communication pathways.

Sensors 208 can capture physical measurements of environment and report the same to processors 202. User interface 210 can include displays, physical buttons, speakers, microphones, keyboards, and the like. Actuators 212 can enable processors 202 to control mechanical forces.

Processing system 200 can be distributed. For example, some components of processing system 200 can reside in a remote hosted network service (e.g., a cloud computing environment) while other components of processing system 200 can reside in a local computing system. Processing system 200 can have a modular design where certain modules include a plurality of the features/functions shown in FIG. 2. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[ABF+18] Sergei Arnautov, Andrey Brito, Pascal Felber, Christof Fetzer, Franz Gregor, Robert Krahn, Wojciech Ozga, André Martin, Valerio Schiavoni, Fábio Silva, Marcus Tenorio, and Nikolaus Thümmel, Pubsubsgx: Exploiting trusted execution environments for privacy-preserving publish/subscribe systems, 2018 IEEE 37th Symposium on Reliable Distributed Systems (SRDS), pages 123-132, (2018).

[avo21] Avocado, <https://github.com/mbailleu/avocado>, (2021).

[awe19] Awesome sgx open source projects, <https://github.com/Maxul/Awesome-SGX-Open-Source>, (2019).

[BCKS18] Marcus Brandenburger, Christian Cachin, Rüdiger Kapitza, and Alessandro Somniotti, Blockchain and trusted computing: Problems, pitfalls, and a solution for hyperledger fabric, arXiv preprint arXiv: 1805.08541, (2018).

[BDK17a] Johannes Behl, Tobias Distler, and Rüdiger Kapitza, Hybrids on steroids: Sgx-based high performance bft, Proceedings of the Twelfth European Conference on Computer Systems, EuroSys '17, page 222-237, New York, NY, USA, (2017), Association for Computing Machinery.

[BDK17b] Johannes Behl, Tobias Distler, and Rüdiger Kapitza, Hybrids on steroids: Sgx-based high performance bft, Proceedings of the Twelfth European Conference on Computer Systems, EuroSys '17, page 222-237, New York, NY, USA, (2017), Association for Computing Machinery.

[BGG+ 21] Maurice Bailleu, Dimitra Giantsidi, Vasilis Gavrielatos, Do Le Quoc, Vijay Nagarajan, and Pramod Bhatotia, Avocado: A secure inmemory distributed storage system, USENIX Annual Technical Conference, pages 65-79, (2021).

[bis18] Bi-sgx: Bioinformatic interpreter on sgx-based secure computing cloud, <https://github.com/hello31337/BI-SGX>, (2018).

[bis19] Boolean isolated searchable encryption (bisen), <https://github.com/bernymac/BISEN>, (2019).

[BMSV18] Mic Bowman, Andrea Miele, Michael Steiner, and Bruno Vavala, Private data objects: an overview, arXiv preprint arXiv: 1807.05686, (2018).

[BSKW23] Samira Briongos, Claudio Soriente, Ghassan Karame, and Annika Wilde, No forking way: Thwarting cloning attacks on intel sgx applications (WIP), (2023).

[BTB+19] Maurice Bailleu, Jörg Thalheim, Pramod Bhatotia, Christof Fetzer, Michio Honda, and Kapil Vaswani, Speicher: Securing lsm-based keyvalue stores using shielded execution, In FAST, pages 173-190, (2019).

[cac23] Cacic use case, <https://github.com/GTA-UFRJ/CACIC-Use-Case>, (2023).

[CBV17] Somnath Chakrabarti, Brandon Baker, and Mona Vij, Intel sgx enabled key manager service with openstack barbican, arXiv preprint arXiv: 1712.07694, (2017).

[CLM+19] Lixia Chen, Jian Li, Ruhui Ma, Haibing Guan, and Hans-Arno Jacobsen, Enclavecache: A secure and scalable key-value cache in multitenant clouds using intel sgx, Middleware '19, pages 14-27, New York, NY, USA, (2019), Association for Computing Machinery.

[con19] Consensgx, <https://github.com/sshsshy/ConsenSGX>, (2019).

[CZ22] Guoxing Chen and Yinqian Zhang, MAGE: Mutual attestation for a group of enclaves without trusted third parties, 31st USENIX Security Symposium (USENIX Security 22), pages 4095-4110, Boston, MA, August (2022), USENIX Association.

[CZK+19] Raymond Cheng, Fan Zhang, Jernej Kos, Warren He, Nicholas Hynes, Noah Johnson, Ari Juels, Andrew Miller, and Dawn Song, Ekiden: A platform for confidentiality-preserving, trustworthy, and performant smart contracts, In 2019 IEEE European Symposium on Security and Privacy (EuroS&P), pages 185-200, (2019).

[CZYL21] Yaxing Chen, Qinghua Zheng, Zheng Yan, and Dan Liu, Qshield: Protecting outsourced cloud data queries with multi-user access control based on sgx, IEEE Transactions on Parallel and Distributed Systems, 32 (2): 485-499, (2021).

[DDKP22] Akash Dhasade, Nevena Dresevic, Anne-Marie Kermarrec, and Rafael Pires, TEE-based decentralized recommender systems: The raw data sharing redemption, 2022 IEEE International Parallel and Distributed Processing Symposium (IPDPS), pages 447-458, (2022).

[deb22] Debe, <https://github.com/yzr95924/DEBE>, (2022).

[ded21] Accelerating encrypted deduplication via sgx, <https://github.com/jingwei87/sgxdedup>, (2021).

[des21] Desearch, <https://github.com/SJTU-IPADS/DeSearch>, (2021).

[DFD+21] Emma Dauterman, Vivian Fang, Ioannis Demertzis, Natacha Crooks, and Raluca Ada Popa, Snoopy: Surpassing the scalability bottleneck of oblivious storage, Proceedings of the ACM SIGOPS 28th Symposium on Operating Systems Principles, SOSP '21, pages 655-671, New York, NY, USA, (2021), Association for Computing Machinery.

[DKZ+21] Natnatee Dokmai, Can Kockan, Kaiyuan Zhu, XiaoFeng Wang, S Cenk Sahinalp, and Hyunghoon Cho, Privacy-preserving genotype imputation in a trusted execution environment, Cell systems, 12 (10): 983-993, (2021).

[DLL19] Judicael B. Djoko, Jack Lange, and Adam J. Lee, *Nexus*: Practical and secure access control on untrusted storage platforms using clientside sgx, 2019 49th Annual IEEE/IFIP International Conference on Dependable Systems and Networks (DSN), pages 401-413, (2019).

[DSBMC+19] Simon Da Silva, Sonia Ben Mokhtar, Stefan Contiu, Daniel Négru, Laurent Réveillère, and Etienne Rivière, Privatube: Privacy-preserving edge-assisted video streaming, Proceedings of the 20th International Middleware Conference, Middleware '19, page 189-201, New York, NY, USA, (2019), Association for Computing Machinery.

[DTZG22] Maya Dotan, Saar Tochner, Aviv Zohar, and Yossi Gilad, Twilight: A differentially private payment channel network, 31st USENIX Security Symposium (USENIX Security 22), pages 555-570, Boston, MA, August (2022), USENIX Association.

[DWY+19] Huayi Duan, Cong Wang, Xingliang Yuan, Yajin Zhou, Qian Wang, and Kui Ren, Lightbox: Full-stack protected stateful middlebox at lightning speed, Proceedings of the 2019 ACM SIGSAC Conference on Computer and Communications Security, CCS '19, page 2351-2367, New York, NY, USA, (2019), Association for Computing Machinery.

[eki17] Ekiden, <https://github.com/ekiden/ekiden>, (2017).

[EZ17] Saba Eskandarian and Matei Zaharia, Oblidb: Oblivious query processing for secure databases, arXiv preprint arXiv: 1710.00458, (2017).

[FBB+17] Benny Fuhry, Raad Bahmani, Ferdinand Brasser, Florian Hahn, Florian Kerschbaum, and Ahmad-Reza Sadeghi, Hardidx: Practical and secure index with sgx, Giovanni Livraga and Sencun Zhu, editors, Data and Applications Security and Privacy XXXI, pages 386-408, Cham, (2017), Springer International Publishing.

[fei22] Feido credential service, intel sgx version, <https://github.com/feido-token>, (2022).

[FHKK20] Benny Fuhry, Lina Hirschoff, Samuel Koesnadi, and Florian Kerschbaum, Segshare: Secure group file sharing in the cloud using enclaves, 2020 50th Annual IEEE/IFIP International Conference on Dependable Systems and Networks (DSN), pages 476-488, (2020).

[Fou19] MobileCoin Foundation, Mobilecoin, <https://github.com/mobilecoinfoundation/mobilecoin>, (2019).

[FPO+22] Bernardo Ferreira, Bernardo Portela, Tiago Oliveira, Guilherme Borges, Henrique Domingos, and João Leitão, Boolean searchable symmetric encryption with filters on trusted hardware, IEEE Transactions on Dependable and Secure Computing, 19 (2): 1307-1319, (2022).

[GRN+18] David Goltzsche, Signe Rüsch, Manuel Nieke, Sébastien Vaucher, Nico Weichbrodt, Valerio Schiavoni, Pierre-Louis Aublin, Paolo Cosa, Christof Fetzer, Pascal Felber, Peter Pietzuch, and Rüdiger Kapitza, Endbox: Scalable middlebox functions using client-side trusted execution, 2018 48th Annual IEEE/IFIP International Conference on Dependable Systems and Networks (DSN), pages 386-397, (2018).

[HOJY19] Thang Hoang, Muslum Ozgur Ozmen, Yeongjin Jang, and Attila A Yavuz, Hardware-supported oram in effect: Practical oblivious search and update on very large dataset, Proceedings on Privacy Enhancing Technologies, 2019 (1): 172-191, (2019).

[Hyp18] Hyperledger, Hyperledger fabric private chaincode, <https://github.com/hyperledger/fabric-private-chaincode>, (2018).

[hys21] bwa-sgx-scone, <https://github.com/dsc-sgx/bwa-sgx-scone>, (2021).

[JCZL21] Mohit Kumar Jangid, Guoxing Chen, Yinqian Zhang, and Zhiqiang Lin, Towards formal verification of state continuity for enclave programs, 30th USENIX Security Symposium (USENIX Security 21), pages 573-590, USENIX Association, August (2021).

[JL22] M Jangid and Zhiqiang Lin, Towards a tee-based v2v protocol for connected and autonomous vehicles, Workshop on Automotive and Autonomous Vehicle Security (AutoSec), (2022).

[Jos20] Prasad Koshy Jose, Confidential computing of machine learning using intel sgx, <https://github.com/prasadkjose/confidential-ml-sgx>, (2020).

[key 18] Cloud key store-secure storage for private credentials, <https://github.com/cloud-key-store/keystore>, (2018).

[KHH+18] Seongmin Kim, Juhyeng Han, Jaehyeong Ha, Taesoo Kim, and Dongsu Han, Sgx-tor: A secure and practical tor anonymity network with sgx enclaves, IEEE/ACM Transactions on Networking, 26 (5): 2174-2187, (2018).

[Kir19] Felix Kirchengast, Secure network interface with sgx, GitHub repository, (2019).

[KKP+18] Klaudia Krawiecka, Arseny Kumnikov, Andrew Paverd, Mohammad Mannan, and N. Asokan, Safekeeper: Protecting web passwords using trusted execution environments, Proceedings of the 2018 World Wide Web Conference, WWW '18, pages 349-358, Republic and Canton of Geneva, CHE, (2018), International World Wide Web Conferences Steering Committee.

[KPMA18] Arseny Kurnikov, Andrew Paverd, Mohammad Mannan, and N. Asokan, Keys in the clouds: Auditable multi-device access to cryptographic credentials, Proceedings of the 13th International Conference on Availability, Reliability and Security, ARES 2018, New York, NY, USA, (2018), Association for Computing Machinery.

[KPW+19] Taehoon Kim, Joongun Park, Jaewook Woo, Seungheun Jeon, and Jaehyuk Huh, Shieldstore: Shielded in-memory key-value storage with sgx, Proceedings of the Fourteenth EuroSys Conference 2019, EuroSys '19, New York, NY, USA, (2019), Association for Computing Machinery.

[KTVO+18] Robert Krahn, Bohdan Trach, Anjo Vahldiek-Oberwagner, Thomas Knauth, Pramod Bhatotia, and Christof Fetzer, Pesos: Policy enhanced secure object store, Proceedings of the Thirteenth EuroSys Conference, EuroSys '18, New York, NY, USA, (2018), Association for Computing Machinery.

[KZD+20] Can Kockan, Kaiyuan Zhu, Natnatee Dokmai, Nikolai Karpov, M Oguzhan Kulekci, David PWoodruff, and S Cenk Sahinalp, Sketching algorithms for genomic data analysis and querying in a secure enclave, Nature methods, 17 (3): 295-301, (2020).

[Lab18] Hyperledger Labs, Hyperledger private data objects, <https://github.com/hyperledger-labs/private-data-objects>, (2018).

[lig18] Lightbox, <https://github.com/lightbox-impl/LightBox>, (2018).

[Lin18] Joshua Lind, Teechain: A secure payment network with asynchronous blockchain access, <https://github.com/lsds/Teechain>, (2018).

[LLP+20] Andrew Law, Chester Leung, Rishabh Poddar, Raluca Ada Popa, Chenyu Shi, Octavian Sima, Chaofan Yu, Xingmeng Zhang, and Wenting Zheng, Secure collaborative training and inference for xgboost, Proceedings of the 2020 Workshop on Privacy-Preserving Machine Learning in Practice, PPMLP'20, pages 21-26, New York, NY, USA, (2020), Association for Computing Machinery.

[LNE+19] Joshua Lind, Oded Naor, Ittay Eyal, Florian Kelbert, Emin Gün Sirer, and Peter Pietzuch, Teechain: A secure payment network with asynchronous blockchain access, SOSP '19, page 63-79, New York, NY, USA, (2019), Association for Computing Machinery.

[Lor21] Rudolf Loretan, Enclave hardening for private ml., <https://github.com/loretanr/dp-gbdt>, (2021).

[LZZ+21] Mingyu Li, Jinhao Zhu, Tianxu Zhang, Cheng Tan, Yubin Xia, Sebastian Angel, and Haibo Chen, Bringing decentralized search to decentralized services, OSDI, pages 331-347, (2021).

[mai20] Sgxsse maiden, <https://github.com/MonashCybersecurityLab/SGXSSE>, (2020).

[MAK+17] Sinisa Matetic, Mansoor Ahmed, Kari Kostiainen, Aritra Dhar, David Sommer, Arthur Gervais, Ari Juels, and Srdjan Capkun, ROTE: Rollback protection for trusted execution, 26th USENIX Security Symposium (USENIX Security 17), pages 1289-1306, Vancouver, BC, August (2017), USENIX Association.

[March17] Moxie Marlinspike, Technology preview: Private contact discovery for signal, (2017).

[MBF+17] Sonia Ben Mokhtar, Antoine Boutet, Pascal Felber, Marcelo Pasin, Rafael Pires, and Valerio Schiavoni, X-search: Revisiting private web search using intel sgx, Proceedings of the 18th ACM/IFIP/USENIX Middleware Conference, Middleware '17, pages 198-208, New York, NY, USA, (2017), Association for Computing Machinery.

[MHWK16] Mitar Milutinovic, Warren He, Howard Wu, and Maxinder Kanwal, Proof of luck: An efficient blockchain consensus protocol, Proceedings of the 1st Workshop on System Software for Trusted Execution, SysTEX '16, New York, NY, USA, (2016), Association for Computing Machinery.

[mob21] Mechanics of mobilecoin: First edition, <https://mobilecoin.com/learn/read-the-whitepapers/mechanics/>, (2021).

[MSM+18] Sinisa Matetic, Moritz Schneider, Andrew Miller, Ari Juels, and Srdjan Capkun, Delegatee: Brokered delegation using trusted execution environments, USENIX Security Symposium, pages 1387-1403, (2018).

[MWS+19] Sinisa Matetic, Karl Wüst, Moritz Schneider, Kari Kostiainen, Ghassan Karame, and Srdjan Capkun, Bite: Bitcoin lightweight client privacy using trusted execution, USENIX Security Symposium, pages 783-800, (2019).

[nex17] Nexus, <https://github.com/sporgj/nexus-code>, (2017).

[NPZZ22] Jianyu Niu, Wei Peng, Xiaokuan Zhang, and Yinqian Zhang, Narrator: Secure and practical state continuity for trusted execution in the cloud, Proceedings of the 2022 ACM SIGSAC Conference on Computer and Communications Security, CCS '22, page 2385-2399, New York, NY, USA, (2022), Association for Computing Machinery.

[oas18] Oasis core, <https://github.com/oasisprotocol/oasis-core>, (2018).

[obl17] Oblidb, <https://github.com/SabaEskandarian/ObliDB>, (2017).

[obs17] Obscuro, <https://github.com/BitObscuro/Obscuro>, (2017).

[opa17] Opaque, <https://github.com/mc2-project/opaque-sql>, (2017).

[PGBM+18] Rafael Pires, David Goltzsche, Sonia Ben Mokhtar, Sara Bouchenak, Antoine Boutet, Pascal Felber, Rüdiger Kapitza, Marcelo Pasin, and Valerio Schiavoni, Cyclosa: Decentralizing private web search through sgx-based browser extensions, 2018 IEEE 38th International Conference on Distributed Computing Systems (ICDCS), pages 467-477, (2018).

[pha19] Phala blockchain, <https://github.com/Phala-Network/phala-blockchain>, (2019).

[pli20] Plinius, <https://github.com/anonymous-xh/plinius>, (2020).

[PLPR18] Rishabh Poddar, Chang Lan, Raluca Ada Popa, and Sylvia Ratnasamy, Safebricks: Shielding network functions in the cloud, 15th {USENIX} Symposium on Networked Systems Design and Implementation ({NSDI} 18), pages 201-216, (2018).

[pol16] Luckychain, <https://github.com/luckychain/lucky>, (2016).

[pos18] Posup: Oblivious search and update platform with sgx, <https://github.com/thanghoang/POSUP>, (2018).

[PPFF16] Rafael Pires, Marcelo Pasin, Pascal Felber, and Christof Fetzer, Secure content-based routing using intel software guard extensions, Proceedings of the 17th International Middleware Conference, Middleware '16, New York, NY, USA, (2016), Association for Computing Machinery.

[pub19] The selis publish/subscribe system, <https://github.com/selisproject/pubsub>, (2019).

[PVC18] Christian Priebe, Kapil Vaswani, and Manuel Costa, Enclavedb: A secure database using sgx, 2018 IEEE Symposium on Security and Privacy (SP), pages 264-278, (2018).

[QGA+20] Do Le Quoc, Franz Gregor, Sergei Arnautov, Roland Kunkel, Pramod Bhatotia, and Christof Fetzer, Securetf: A secure tensorflow framework, Proceedings of the 21st International Middleware Conference, Middleware '20, page 44-59, New York, NY, USA, (2020), Association for Computing Machinery.

[qsh20] Qshield, <https://github.com/fishermano/QShield>, (2020).

[RBK19] Signe Rüsch, Kai Bleeke, and Rüdiger Kapitza, Bloxy: Providing transparent and generic bft-based ordering services for blockchains, 2019 38th Symposium on Reliable Distributed Systems (SRDS), pages 305-30509, October (2019).

[rex22] REX: Sgx decentralized recommender, <https://github.com/rafaelppires/rex>, (2022).

[RGM16] Lars Richter, Johannes Götzfried, and Tilo Müller, Isolating operating system components with intel sgx, Proceedings of the 1st Workshop on System Software for Trusted Execution, SysTEX '16, New York, NY, USA, (2016), Association for Computing Machinery.

[RLY+21] Yanjing Ren, Jingwei Li, Zuoru Yang, Patrick P C Lee, and Xiaosong Zhang, Sgxdedup, USENIX Annual Technical Conference, pages 957-971, (2021).

[saf16] Safebricks, <https://github.com/YangZhou1997/SafeBricks>, (2016).

[saf18] Safekeeper-protecting web passwords using trusted execution environments, <https://github.com/SafeKeeper/safekeeper-server>, (2018).

[SDH+22] Fabian Schwarz, Khue Do, Gunnar Heide, Lucjan Hanzlik, and Christian Rossow, Feido: Recoverable fido2 tokens using electronic ids., Proceedings of the 2022 ACM SIGSAC Conference on Computer and Communications Security, CCS '22, page 2581-2594, New York, NY, USA, (2022), Association for Computing Machinery.

[sen20] Seng, the sgx-enforcing network gateway, <https://github.com/sengsgx/sengsgx>, (2020).

[SG19] Sajin Sasy and Ian Goldberg, Consensgx: Scaling anonymous communications networks with trusted execution environments, Proc. Priv. Enhancing Technol., 2019 (3): 331-349, (2019).

[sgx16] Intel® software guard extensions for linux*os, <https://github.com/intel/linux-sgx>, (2016).

[sgx17a] Sgx enabled openstack barbican key management system, <https://github.com/cloud-security-research/sgx-kms>, (2017).

[sgx17b] sgx-papers, <https://github.com/vschiavoni/sgx-papers>, (2017).

[sgx17c] Sgx-tor, <https://github.com/kaist-ina/SGX-Tor>, (2017).

[shi18] Shieldstore, <https://github.com/cocoppang/ShieldStore>, (2018).

[sig17] Private contact discovery service (beta), <https://github.com/signalapp/ContactDiscoveryService>, (2017).

[SKKG16] Ming-Wei Shih, Mohan Kumar, Taesoo Kim, and Ada Gavrilovska, Snfv: Securing nfv states by using sgx, Proceedings of the 2016 ACM International Workshop on Security in Software Defined Networks & Network Function Virtualization, SDN-NFV Security '16, page 45-48, New York, NY, USA, (2016), Association for Computing Machinery.
[sks18] Skses, <https://github.com/ndokmai/sgx-genome-variants-search>, (2018).
[sma20] Smac: Secure genotype imputation in intel sgx, <https://github.com/ndokmai/sgx-genotype-imputation>, (2020).
[sno21] Snoopy: A scalable oblivious storage system, <https://github.com/ucbrise/snoopy>, (2021).
[sot22] Artifact for paper #1520 soter: Guarding black-box inference for general neural networks at the edge, <https://github.com/hku-systems/SOTER>, (2022).
[spe15] Speicherdpdk, <https://github.com/mbailleu/SpeicherDPDK>, (2015).
[SQJ+22] Tianxiang Shen, Ji Qi, Jianyu Jiang, Xian Wang, Siyuan Wen, Xusheng Chen, Shixiong Zhao, Sen Wang, Li Chen, Xiapu Luo, Fengwei Zhang, and Heming Cui, SOTER: Guarding black-box inference for general neural networks at the edge, 2022 USENIX Annual Technical Conference (USENIX ATC 22), pages 723-738, Carlsbad, CA, July (2022), USENIX Association.
[SR20] Fabian Schwarz and Christian Rossow, Seng, the sgx-enforcing network gateway: Authorizing communication from shielded clients, Proceedings of the 29th USENIX Conference on Security Symposium, pages 753-770, (2020).
[sta20] Stanlite, <https://github.com/ibr-ds/STANlite>, (2020).
[ste17] Stealthdb, <https://github.com/cryptograph/stealthdb>, (2017).
[SWK+18] Vasily Sartakov, Nico Weichbrodt, Sebastian Krieter, Thomas Leich, and Rudiger Kapitza, Stanlite—a database engine for secure data processing at rack-scale level, 2018 IEEE International Conference on Cloud Engineering (IC2E), pages 23-33, (2018).
[SWLL21] Yuanyuan Sun, Sheng Wang, Huorong Li, and Feifei Li, Building enclave-native storage engines for practical encrypted databases, Proc. VLDB Endow., 14 (6): 1019-1032, feb. (2021).
[TB18a] Florian Tramer and Dan Boneh, Slalom: Fast, verifiable and private execution of neural networks in trusted hardware, arXiv preprint arXiv: 1806.03287, (2018).
[TB18b] Florian Tramer and Dan Boneh, Slalom, <https://github.com/ftramer/slalom>, (2018).
[TGS+22] Guilherme A. Thomaz, Matheus B. Guerra, Matteo Sammarco, Marcin Detyniecki, and Miguel Elias M. Campista, Tamper-proof access control for iot clouds using enclaves, (2022).
[TLK+18] Muoi Tran, Loi Luu, Min Suk Kang, Iddo Bentov, and Prateek Saxena, Obscuro: A bitcoin mixer using trusted execution environments, Proceedings of the 34th Annual Computer Security Applications Conference, ACSAC '18, page 692-701, New York, NY, USA, (2018), Association for Computing Machinery.
[tow16] Town crier: An authenticated data feed for smart contracts, <https://github.com/bl4ck5un/Town-Crier>, (2016).
[tre16] Tresorsgx, <https://github.com/ayeks/TresorSGX>, (2016).
[twi22] Implementation of the paper "differentially-private payment channels with twilight,"<https://github.com/saart/Twilight>, (2022).
[v2v22] V2v sgx, <https://github.com/OSUSecLab/v2v-sgx-prelim>, (2022).
[VBPS17] Jo Van Bulck, Frank Piessens, and Raoul Strackx, Sgx-step: A practical attack framework for precise enclave execution control, Proceedings of the 2nd Workshop on System Software for Trusted Execution, SysTEX'17, New York, NY, USA, (2017), Association for Computing Machinery.
[VGG19] Dhinakaran Vinayagamurthy, Alexey Gribov, and Sergey Gorbunov, Stealthdb: a scalable encrypted database with full sql query support, Proc. Priv. Enhancing Technol., 2019 (3): 370-388, (2019).
[VLY+21] Viet Vo, Shangqi Lai, Xingliang Yuan, Surya Nepal, and Joseph K. Liu, Towards efficient and strong backward private searchable encryption with secure enclaves, Kazue Sako and Nils Ole Tippenhauer, editors, Applied Cryptography and Network Security, pages 50-75, Cham, (2021), Springer International Publishing.
[WLL+21] Chathura Widanage, Weijie Liu, Jiayu Li, Hongbo Chen, XiaoFeng Wang, Haixu Tang, and Judy Fox, Hysec-flow: Privacy-preserving genomic computing with sgx-based big-data analytics framework, 2021 IEEE 14th International Conference on Cloud Computing (CLOUD), pages 733-743, (2021).
[xgb20] Secure xgboost, <https://github.com/mc2-project/secure-xgboost>, (2020).
[xse20] X-search, <https://github.com/Sand-jrd/SGX-Search>, (2020).
[YCL+21] Fan Yang, Youmin Chen, Youyou Lu, Qing Wang, and Jiwu Shu, Aria: Tolerating skewed workloads in secure in-memory key-value stores, 2021 IEEE 37th International Conference on Data Engineering (ICDE), pages 1020-1031, (2021).
[YFST21] Peterson Yuhala, Pascal Felber, Valerio Schiavoni, and Alain Tchana, Plinius: Secure and persistent machine learning model training, 2021 51st Annual IEEE/IFIP International Conference on Dependable Systems and Networks (DSN), pages 52-62, June (2021).
[YLL22] Zuoru Yang, Jingwei Li, and Patrick P. C. Lee, Secure and lightweight deduplicated storage via shielded Deduplication-Before-Encryption, 2022 USENIX Annual Technical Conference (USENIX ATC 22), pages 37-52, Carlsbad, CA, July (2022), USENIX Association.
[YZJ19] Hang Yin, Shunfan Zhou, and Jun Jiang, Phala network: A confidential smart contract network based on polkadot, (2019).
[ZCC+16] Fan Zhang, Ethan Cecchetti, Kyle Croman, Ari Juels, and Elaine Shi, Town crier: An authenticated data feed for smart contracts, Proceedings of the 2016 ACM SIGSAC Conference on Computer and Communications Security, CCS '16, page 270-282, New York, NY, USA, (2016), Association for Computing Machinery.
[ZDB+17] Wenting Zheng, Ankur Dave, Jethro G Beekman, Raluca Ada Popa, Joseph E Gonzalez, and Ion Stoica, Opaque: An oblivious and encrypted distributed analytics platform, NSDI, volume 17, pages 283-298, (2017).

What is claimed is:

1. A computer-implemented method for providing a service to a trusted execution environment (TEE), the computer-implemented method comprising:
   writing, by a process running in the TEE, a data item to a pre-defined cache location, wherein the TEE comprises a dedicated protected portion of a central processing unit (CPU);
   monitoring whether the data item is evicted from the pre-defined cache location, wherein the monitoring includes continuously or iteratively checking the predefined cache location during a setup procedure that comprises generating and exchanging a cryptographic key pair; and accepting that the setup procedure is complete based on the data item not being evicted from the pre-defined cache location during the setup procedure.

2. The computer-implemented method of claim 1, wherein the data item is written to the pre-defined cache location by the process via a selected channel that is hard-coded into an updated version for the TEE.

3. The computer-implemented method of claim 1, further comprising:

generating and exchanging, by the process with at least one other process running in a TEE deployed on a different platform, the cryptographic key-pair; and sealing, by the process, the cryptographic key-pair to local storage.

4. The computer-implemented method of claim 3, wherein exchanging the cryptographic key-pair includes sending between the process and the at least one other process a corresponding public key of the cryptographic key-pair with a hash of a respective seal key such that the at least one other process generated an associated cryptographic key-pair.

5. The computer-implemented method of claim 4, wherein a tuple of the public key represents an identifier of the process.

6. The computer-implemented method of claim 4, further comprising:

receiving, by the process, a session key in response to mutually attesting with the at least one other process;

computing, by the process, a hash of a list of received public keys, the hash of the list of received public keys including the public key of the process and the at least one other process; and receiving, by the process from the at least one other process, a hash of a list of received public keys of the at least one other process via a secure channel using the session key.

7. The computer-implemented method of claim 6, further comprising verifying, by the process, that the hash of the list of received public keys from the at least one other process is the same as the computed hash, wherein the process continues in response to the hashes being the same or terminates in response to the hashes not being the same.

8. The computer-implemented method of claim 7, further comprising storing the list of received public keys in a persistent state.

9. The computer-implemented method of claim 8, further comprising generating a monotonic counter that is set to zero and stored in persistent memory of the TEE based on verifying the hashes are the same.

10. The computer-implemented method of claim 9, further comprising sealing, by the process, the persistent state to local storage and including the monotonic counter, wherein the monotonic counter is in an inc-then-store mode.

11. The computer-implemented method of claim 1, further comprising:

receiving, by the process, a local attestation request from an application TEE;

establishing, by the application TEE and the process, a shared key that is used to encrypt communications between the application TEE and the process;

transmitting, by the application TEE to the process, one or more parameters including an identifier (id), a first indication of how many clones with a same binary can run in parallel, and a second indication that determines if the clones share a same state or maintain individual states; and updating, by the process, an application configuration table and an application session table based on receiving the one or more parameters by at least:

scanning the application configuration table to determine that an entry does not exist that corresponds to the one or more parameters;

initializing a new monotonic counter that is set to zero;

updating parameter m of the application configuration table to 1; and storing data from the application in the application session table.

12. The computer-implemented method of claim 11, wherein the one or more parameters are written as constants in code for the application TEE.

13. The computer-implemented method of claim 1, wherein the steps of writing the data item to the pre-defined cache location and monitoring whether the data item is evicted from the pre-defined cache location are continuously or iteratively performed until accepting that the setup procedure is complete.

14. The computer-implemented method of claim 1, further comprising:

receiving, by the process, a state update, for an application TEE that includes a monotonic counter value associated with a monotonic counter of the TEE that is used in inc-then-store mode, and recovery data d;

storing, by the process, the recovery data in an in-memory key value store (KVS);

incrementing, by the process, the counter for the application TEE and the monotonic counter, and signing the monotonic counter;

sending, by the process, the signed monotonic counter and the recovery data d to at least one other process running in a TEE deployed on a different platform, wherein the at least one other process updates an associated group counter table;

receiving, by the process and from the at least one other process, an echo message that contains the signed monotonic counter;

transmitting, by the process and to the at least one other process, the echo message in response to receiving a certain number of echo messages from other processes of other TEEs, wherein the at least one other process compares the monotonic counter value of the echo message it previously sent to the monotonic counter value of the echo message it received from the process and the monotonic counter value included in the group counter table;

receiving, by the process, an acknowledgement message from the at least one other process in response to the monotonic counter value matching between the echo messages and the group counter table;

sealing, by the process, the state of the application TEE with the monotonic counter value to local storage; and sending, by the process to the application TEE, the incremented counter to complete the state update for the application TEE.

15. The computer-implemented method of claim 1, further comprising:

in response to the process crashing, writing, by the process, the data item to a pre-defined cache location;

monitoring whether the data item is evicted from the pre-defined cache location, wherein the monitoring includes continuously or iteratively checking the pre-defined cache location during a restart protocol for the process;

establishing, by the process with at least one other process running in a TEE deployed on a different platform, a new session key by sending a join request from the process to the at least one other process and receiving a response from the at least one other process;

unsealing, by the process, a persistent state and extracting a monotonic counter, wherein unsealing the persistent state comprises:

obtaining, by the process, an encrypted state from an associated operating system;

fetching, by the process, an unsealing key; and decrypting, by the process, the encrypted state with the unsealing key;

requesting, by the process and from the at least one other process, the monotonic counter, the at least one other process identifying the monotonic counter in an associated group counter table;

extracting, by the process, a highest counter value from the received monotonic counter from the at least one other process;

comparing, by the process, the monotonic counter that was previously sealed with the highest counter value; and incrementing, by the process, the monotonic counter that was previously sealed and sealing the persistent state according to the restart protocol in response to the monotonic counter that was previously sealed matching the highest counter value thereby completing the restart protocol.

16. A computer system for providing a service to a trusted execution environment (TEE), the computer system comprising one or more hardware processors which, alone or in combination, are configured to provide for execution of the following steps:

writing, by a process running in the TEE, a data item to a pre-defined cache location, wherein the TEE comprises a dedicated protected portion of a central processing unit (CPU);

monitoring whether the data item is evicted from the pre-defined cache location, wherein the monitoring includes continuously or iteratively checking the pre-defined cache location during a setup procedure that comprises generating and exchanging a cryptographic key-pair; and accepting that the setup procedure is complete based on the data item not being evicted from the pre-defined cache location during the setup procedure.

17. A tangible, non-transitory computer-readable medium having instructions stored thereon which, upon being executed by one or more processors, provide for providing a service to a trusted execution environment (TEE) by execution of the following steps:

writing, by a process running in the TEE, a data item to a pre-defined cache location, wherein the TEE comprises a dedicated protected portion of a central processing unit (CPU);

monitoring whether the data item is evicted from the pre-defined cache location, wherein the monitoring includes continuously or iteratively checking the pre-defined cache location during a setup procedure that comprises generating and exchanging a cryptographic key-pair; and accepting that the setup procedure is complete based on the data item not being evicted from the pre-defined cache location during the setup procedure.

\* \* \* \* \*